US010416939B2

(12) United States Patent
Kato

(10) Patent No.: US 10,416,939 B2
(45) Date of Patent: Sep. 17, 2019

(54) COMMUNICATION TERMINAL, COMMUNICATION SYSTEM, COMMUNICATION CONTROL METHOD, AND NON-TRANSITORY COMPUTER-READABLE MEDIUM

(71) Applicant: Yoshinaga Kato, Kanagawa (JP)

(72) Inventor: Yoshinaga Kato, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/933,824

(22) Filed: Mar. 23, 2018

(65) Prior Publication Data
US 2018/0285042 A1 Oct. 4, 2018

(30) Foreign Application Priority Data

Mar. 31, 2017 (JP) .................................. 2017-071214
Mar. 20, 2018 (JP) .................................. 2018-053006

(51) Int. Cl.
*G06F 3/12* (2006.01)
*H04N 1/00* (2006.01)
(Continued)

(52) U.S. Cl.
CPC .......... *G06F 3/1238* (2013.01); *G06F 3/1205* (2013.01); *G06F 3/1253* (2013.01); *G06F 3/1275* (2013.01); *G06F 3/1285* (2013.01); *G06F 21/608* (2013.01); *H04L 12/1822* (2013.01); *H04L 63/0853* (2013.01); *H04N 1/00228* (2013.01); *H04N 1/4426* (2013.01); *H04W 12/06* (2013.01); *G06F 3/1222* (2013.01); *H04N 2201/006* (2013.01);
(Continued)

(58) Field of Classification Search
CPC ...................................... G06F 3/1238
USPC ........................................................ 358/1.15
See application file for complete search history.

(56) References Cited

U.S. PATENT DOCUMENTS

2013/0242335 A1 9/2013 Naitoh et al.
2014/0380193 A1* 12/2014 Coplen ............... G06F 3/04847
715/753
(Continued)

FOREIGN PATENT DOCUMENTS

JP 2000-250861 9/2000
JP 2001-292266 10/2001
JP 2013-218661 10/2013

*Primary Examiner* — Jacky X Zheng
(74) *Attorney, Agent, or Firm* — Harness, Dickey & Pierce, P.L.C.

(57) ABSTRACT

A shared terminal includes circuitry. The circuitry controls a display to display an image to a plurality of users, and obtains, from a first terminal of a first user, first terminal identification information. The circuitry transmits the first terminal identification information and an authentication request, to a terminal management server, and receives a first user name of the first user from the terminal management server. The circuitry controls the display to display a print configuration screen, and receives setting of print parameters for an image being displayed on the display via the print configuration screen, and receives other user name of the plurality of users other than the first user. The circuitry transmits data generated based on the image displayed on the display, the first user name, the other user name, and the print parameters that are set on the print configuration screen, to a print server.

20 Claims, 31 Drawing Sheets

(51) Int. Cl.
*H04L 12/18* (2006.01)
*H04N 1/44* (2006.01)
*H04L 29/06* (2006.01)
*G06F 21/60* (2013.01)
*H04W 12/06* (2009.01)

(52) U.S. Cl.
CPC ............... *H04N 2201/0094* (2013.01); *H04N 2201/3205* (2013.01)

(56) References Cited

U.S. PATENT DOCUMENTS

| | | |
|---|---|---|
| 2015/0092233 A1* | 4/2015 | Park ..................... G06F 3/1288 358/1.15 |
| 2015/0339561 A1* | 11/2015 | Takenaka ................. B41J 29/00 358/1.14 |
| 2016/0165180 A1 | 6/2016 | Kato et al. |
| 2016/0294571 A1 | 10/2016 | Kato et al. |
| 2016/0295162 A1 | 10/2016 | Kato et al. |
| 2016/0295354 A1 | 10/2016 | Kato et al. |
| 2016/0295626 A1 | 10/2016 | Kato et al. |
| 2016/0352787 A1 | 12/2016 | Kato et al. |
| 2016/0366371 A1 | 12/2016 | Kato et al. |
| 2017/0090843 A1 | 3/2017 | Kato et al. |
| 2017/0171511 A1 | 6/2017 | Kato et al. |
| 2017/0249764 A1 | 8/2017 | Fujii et al. |
| 2018/0027146 A1* | 1/2018 | Kato ................... H04N 1/4433 |
| 2018/0069857 A1* | 3/2018 | Katsuragi ............. G06F 3/1454 |

\* cited by examiner

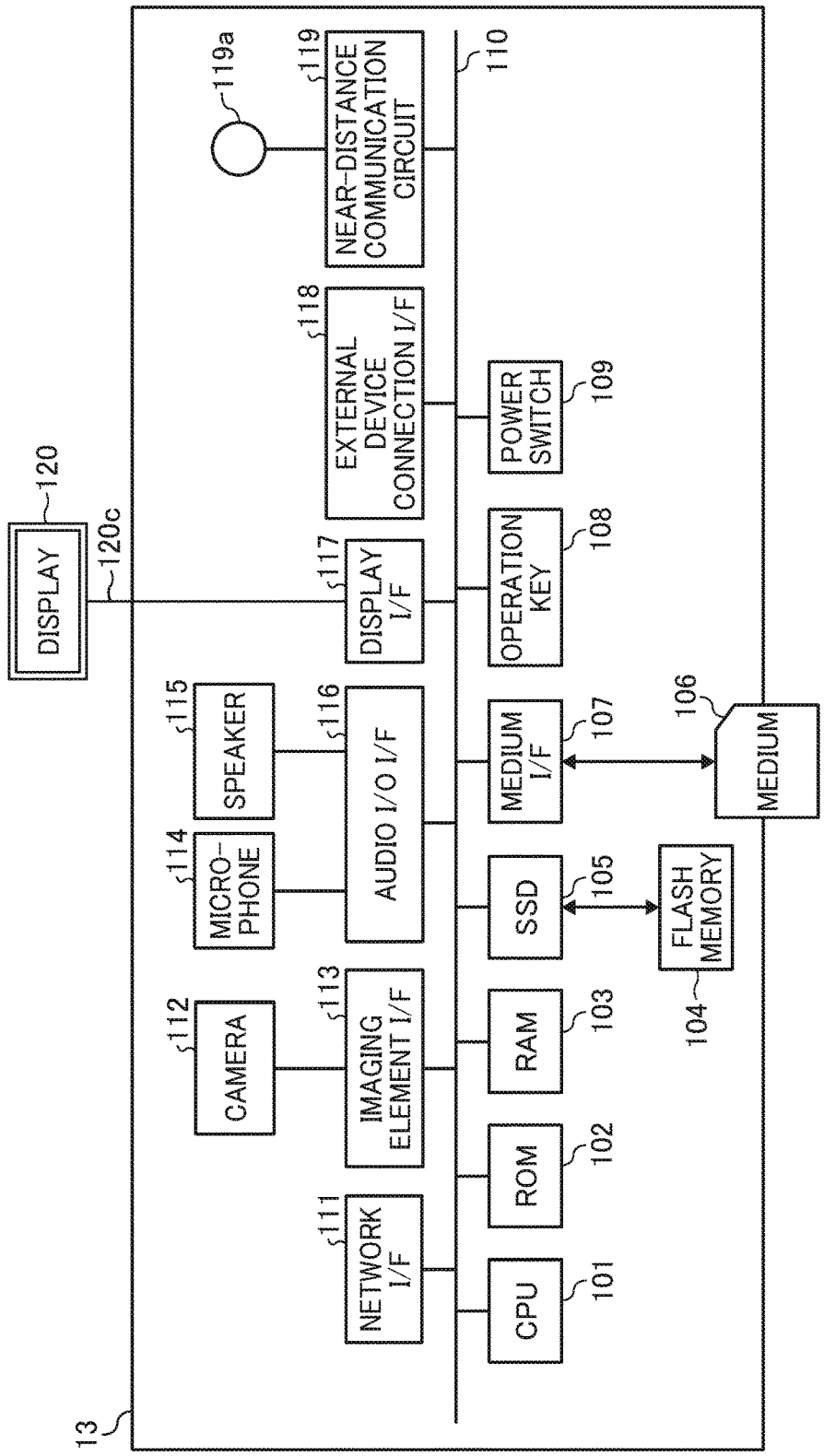

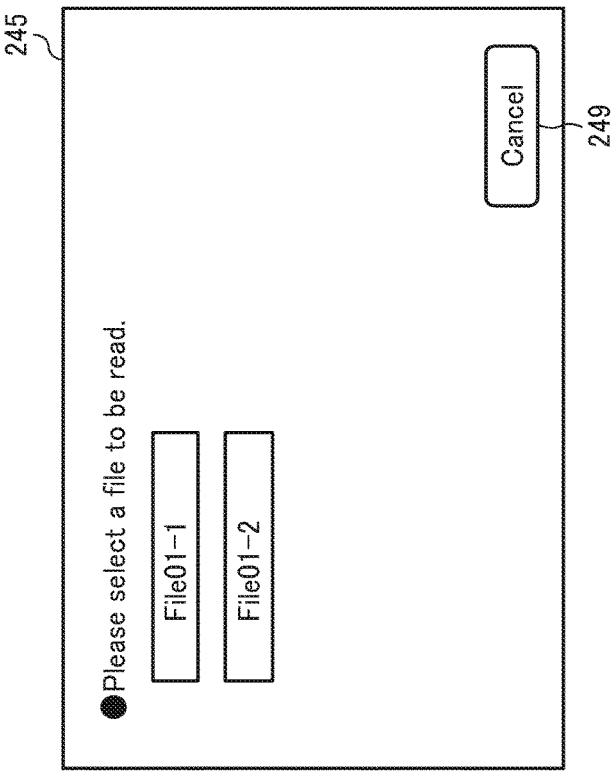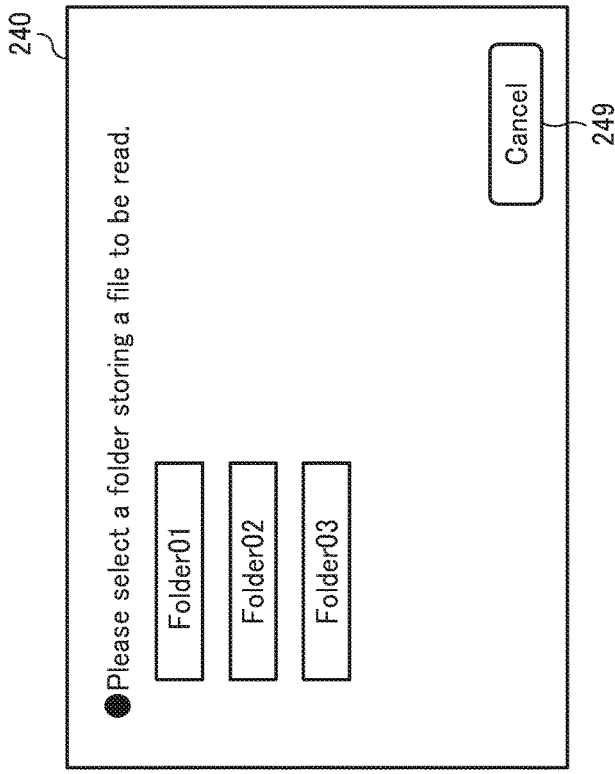

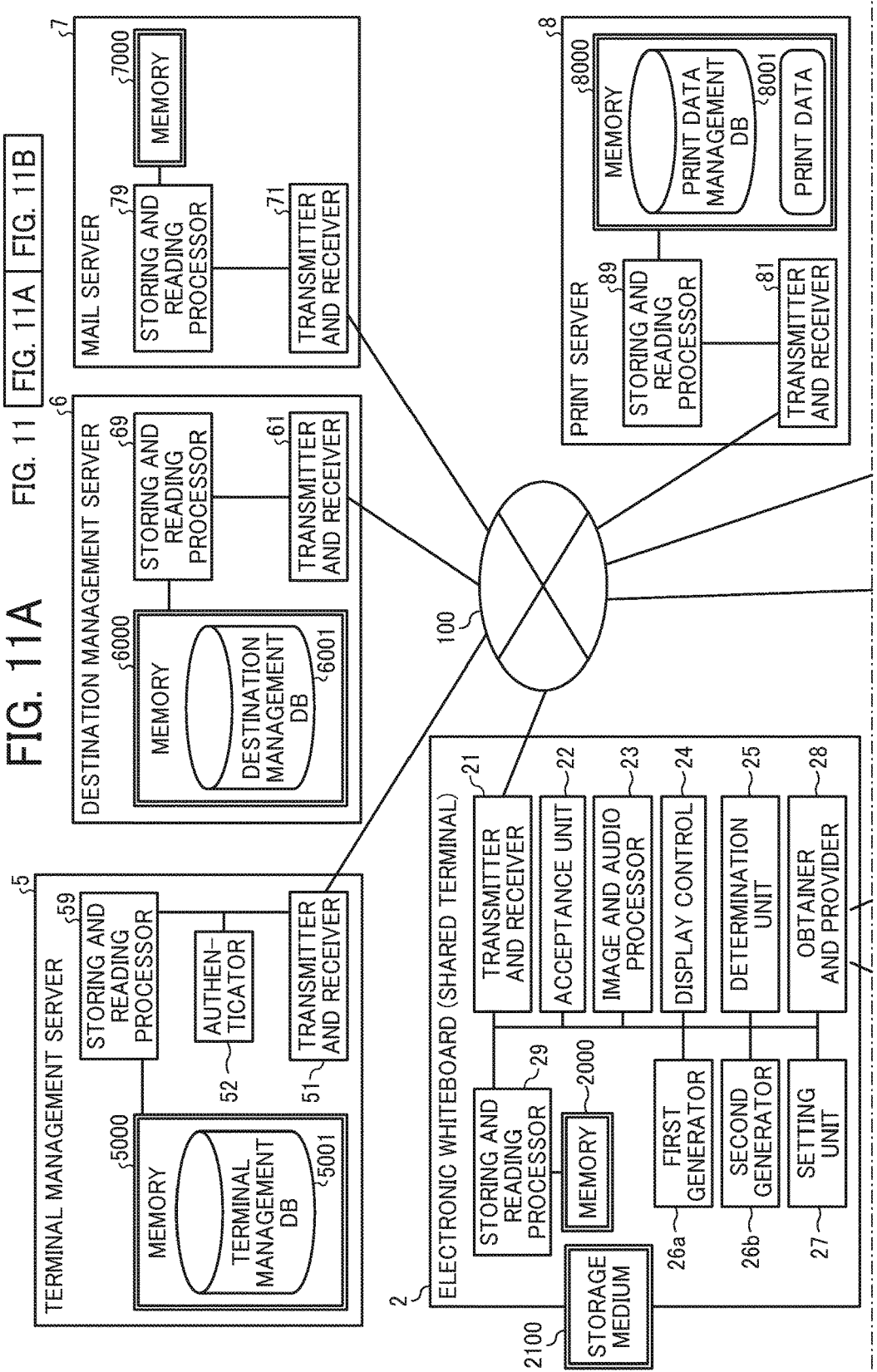

FIG. 12A

| TERMINAL ID (PRIVATELY-OWNED TERMINAL) | USER ID | USER |
|---|---|---|
| aaa | 10001 | Kato |
| bbb | 10002 | Jim |
| ... | ... | ... |

FIG. 12B

| USER ID | EMAIL ADDRESS |
|---|---|
| 10001 | aaa@xxx.co.jp |
| 10002 | bbb@xxx.co.jp |
| ... | ... |

FIG. 12C

| USER NAME (PRINT REQUESTER NAME) | FILE NAME | PRINT SETTING PARAMETER |
|---|---|---|
| Kato | 1001 | Color, A4, ··· |
| Kato | 1002 | Monochrome, A4, ··· |
| Jim | 2001 | Color, A3, ··· |
| Kato, Mary | 3002 | Color, A4, ··· |
| ... | ... | ... |

FIG. 14A  LOGIN SCREEN 170

● START LOGIN PROCESS

Hold privately-owned terminal over

FIG. 14B  ERROR NOTIFICATION SCREEN 180

Please use different privately-owned terminal

FIG. 14C  DRAWING START SCREEN 190

Welcome, Mr. KATO

● Page content will be sent by email.

Registered address book | Manual input — 272, 273

USER1@...
USER2@...

USER1@... — 274
USER2@...

277 — Send    Cancel — 279

270

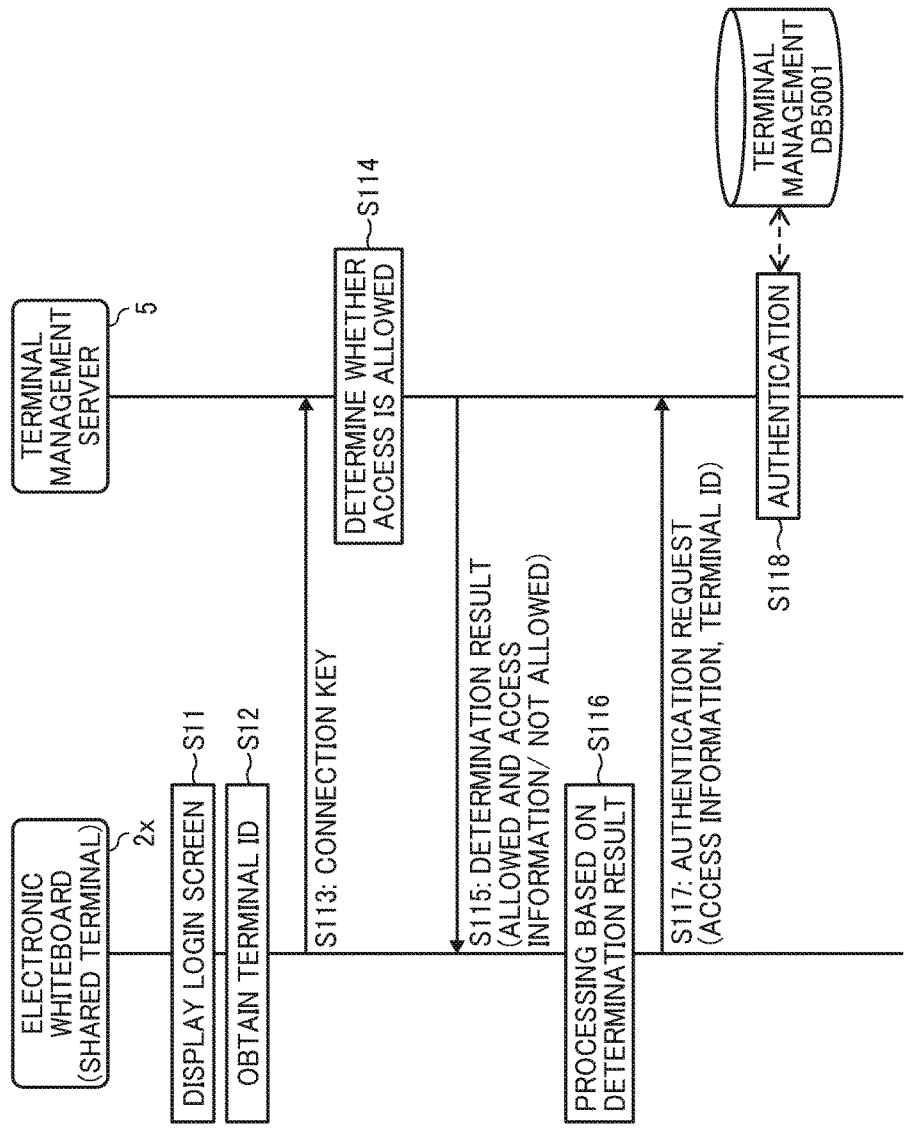

COMMUNICATION TERMINAL, COMMUNICATION SYSTEM, COMMUNICATION CONTROL METHOD, AND NON-TRANSITORY COMPUTER-READABLE MEDIUM

CROSS-REFERENCE TO RELATED APPLICATIONS

This patent application is based on and claims priority pursuant to 35 U.S.C. § 119(a) to Japanese Patent Application Nos. 2017-071214, filed on Mar. 31, 2017 and 2018-053006, filed on Mar. 20, 2018, in the Japan Patent Office, the entire disclosures of which are hereby incorporated by reference herein.

BACKGROUND

Technical Field

The present disclosure relates to a shared terminal, a communication system, a communication control method, and a non-transitory computer-readable medium.

Description of the Related Art

Recently, electronic whiteboards that can be shared by a plurality of users are disposed in various types of places such as meeting rooms in companies or classrooms in educational institutions. The electronic whiteboard is provided with a touch panel display of large size, on which each user draws an image with a dedicated electronic pen or his or her finger. This enables the users to conduct a meeting or a lecture while viewing a same image drawn by each user.

Further, a system is proposed, in which a computer device shared by a plurality of users is provided, and each user is able to log into the computer device by bringing a shared contactless integrated circuit (IC) card close to the computer device, even if the user does not remember the login identifier (ID).

Furthermore, as one of the usage situations of a shared terminal such as the electronic whiteboard, there is a case where only important persons such as VIPs of a company use the shared terminal. In this case, in order to ensure security, the usage of the shared terminal may be limited to users who are able to log in the shared terminal with the IC card, for example. When an image drawn or displayed on a screen of the shared terminal is to be printed at a printing device such as a multifunction peripheral, product or printer (MFP) connected through a communication network, it is desirable that authentication should be performed also at the printing device before printing. On the other hand, such important persons often have another person who is trustworthy such as a secretary perform printing on behalf of themselves.

SUMMARY

A shared terminal includes circuitry. The circuitry controls a display to display an image to a plurality of users, the plurality of users simultaneously sharing a use of the shared terminal. The circuitry obtains, from a first terminal of a first user of the plurality of users, first terminal identification information for identifying the first terminal. The circuitry transmits the first terminal identification information of the first terminal and an authentication request, to a terminal management server, the terminal management server storing, for each one of the plurality of users, terminal identification information for identifying a terminal of the user in association with a user name of the user. The circuitry receives a first user name of the first user, the first user name being transmitted from the terminal management server based on a successful authentication result for the authentication request, the successful authentication result being obtained based on a determination that the first terminal identification information is stored in the terminal management server. The circuitry controls the display to display a print configuration screen, receives setting of print parameters for an image being displayed on the display via the print configuration screen, and receive other user name of the plurality of users other than the first user. The circuitry transmits data generated based on the image displayed on the display, the first user name, the other user name, and the print parameters that are set on the print configuration screen, to a print server, the print server storing, for data generated based on the image displayed on the display, the first user name and the other user name each as a print requester name, and the print parameters, in association with each other.

BRIEF DESCRIPTION OF THE DRAWINGS

A more complete appreciation of the embodiments and many of the attendant advantages and features thereof can be readily obtained and understood from the following detailed description with reference to the accompanying drawings, wherein:

FIG. 7 is a schematic block diagram illustrating a hardware configuration of a videoconference terminal, according to an embodiment of the present disclosure;

FIGS. 9A, 9B, 9C, and 9D each illustrates an example screen displayed by the display at the electronic whiteboard according to an embodiment of the present disclosure;

FIGS. 11A and 11B are a schematic block diagram illustrating a functional configuration of the communication system, according to an embodiment of the present disclosure;

FIG. 12A is a conceptual diagram illustrating a terminal management table, according to an embodiment of the present disclosure;

FIG. 12B is a conceptual diagram illustrating a destination management table, according to an embodiment of the present disclosure;

FIG. 12C is a conceptual diagram illustrating a print data management table according to an embodiment of the present disclosure;

FIGS. 14A, 14B, 14C and 14D each illustrates an example screen displayed by the display at the electronic whiteboard according to an embodiment of the present disclosure;

FIG. 27 is a sequence diagram illustrating another example of the login process, according to an embodiment of the present disclosure.

Figure 1:
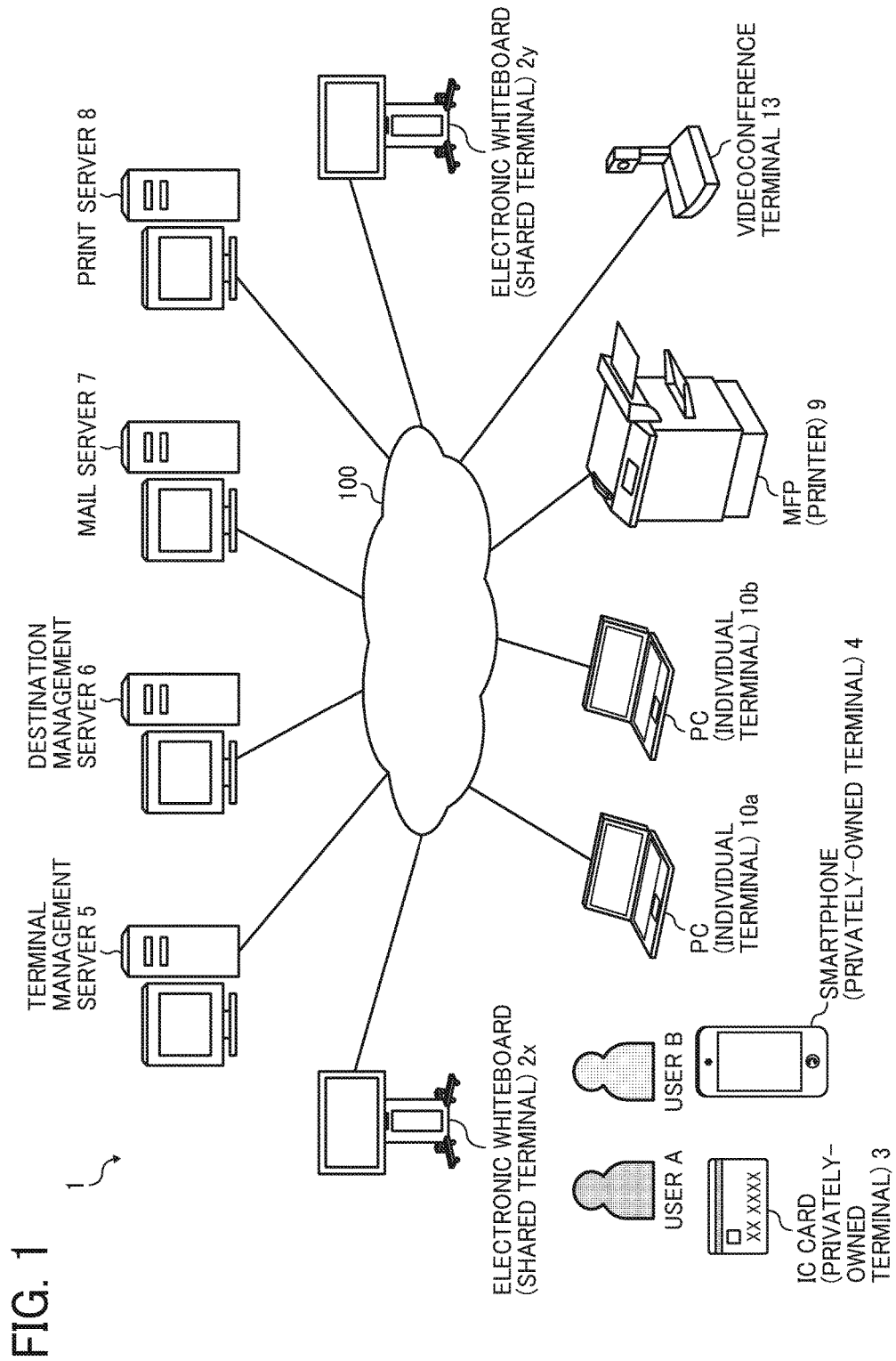
FIG. 1 is a schematic diagram illustrating a communication system according to an embodiment of the present disclosure.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

As used herein, the singular forms "a", "an", and "the" are intended to include the multiple forms as well, unless the context clearly indicates otherwise.

Referring to the drawings, a communication system 1 is described in detail according to an embodiment.

<Overview of System Configuration>

First, an overview of a configuration of the communication system 1 is described according to an embodiment. FIG. 1 is a schematic diagram illustrating a configuration of the communication system 1 according to the embodiment.

As illustrated in FIG. 1, the communication system 1 of the embodiment includes an electronic whiteboard 2x, an electronic whiteboard 2y, an integrated circuit (IC) card 3, a smartphone 4, a terminal management server 5, a destination management server 6, a mail server 7, a print server 8, a multifunction peripheral, product or printer (MFP) 9, personal computers (PCs) 10a and 10b, and a videoconference terminal 13. For simplicity, in the following, any arbitrary one of the electronic whiteboards 2x and 2y is referred to as the "electronic whiteboard 2". Any arbitrary one of the PCs 10a and 10b is referred to as the "PC 10".

The electronic whiteboard 2, the terminal management server 5, the destination management server 6, the mail server 7, the print server 8, the MFP 9, the PC 10, and the videoconference terminal 13 are communicable with one another through a communication network 100. The communication network 100 is implemented by the Internet, mobile communication network, local area network (LAN), etc. The communication network 100 may include, in addition to a wired network, a wireless network in compliance with such as 3rd Generation (3G), Worldwide Interoperability for Microwave Access (WiMAX), Long Term Evolution (LTE), etc. The electronic whiteboard 2, IC card 3, and smartphone 4 are communicable with one another using a near-distance communication technology in compliance with such as Near Field Communication (NFC) (Registered Trademark). The smartphone 4 may communicate with the electronic whiteboard 2 using the near-distance communication technology in compliance with such as Bluetooth (Registered Trademark).

One of the electronic whiteboard 2x and the electronic whiteboard 2y transmits or receives drawing image data representing a content drawn by a user ("drawing image data"), to or from the other one of the electronic whiteboard 2x and the electronic whiteboard 2y. That is, the content drawn at the electronic whiteboard 2x is displayed at the electronic whiteboard 2y, and the content drawn at the electronic whiteboard 2y is displayed at the electronic whiteboard 2x.

The electronic whiteboard 2 generates image data in Refined Printing Command Stream (RPCS) based on the drawing image data, and transmits the generated image data to the MFP 9 through the communication network 100. In another example, the electronic whiteboard 2 generates image data in Portable Document Format (PDF) based on the drawing image data, and transmits an electronic mail attached with the generated image data to the PC 10 through the communication network 100. The MFP 9 prints an image based on the drawing image data received from the electronic whiteboard 2. The PC 10 displays an image based on the drawing image data extracted from the electronic mail.

The electronic whiteboard 2 may display an image other than the drawing image drawn by the user ("non-drawing image"), such as an image of a presentation material. The electronic whiteboard 2 generates image data in RPCS based on non-drawing image data, and transmits the generated image data to the MFP 9 through the communication network 100. In another example, the electronic whiteboard 2 generates image data in PDF based on the non-drawing image data, and transmits an electronic mail attached with the generated image data to the PC 10 through the communication network 100.

In this disclosure, the image data in PRCS and the image data in PDF each represent a content of a drawing image drawn by a user, or a non-drawing image displayed by a user, for example. The electronic whiteboard 2 is an example of a shared terminal to be shared by a plurality of users. The plurality of users are able to view a same image simultaneously. The IC card 3 and the smartphone 4 are an example of a privately-owned terminal, privately owned by each user. The MFP 9 is an example of a printer. The PC 10 is an example of an individual terminal operated by an individual user. The image data may be in any suitable format other than RPCS, such as in Printer Control Language (PCL), Page Description Language (PDL), and Post Script (PS).

In FIG. 1, the user A, who owns the IC card 3, brings the IC card 3 to a meeting being held with the electronic whiteboard 2. The user B, who owns the smartphone 4, brings the smartphone 4 to the meeting being held with the electronic whiteboard 2. The PC 10a is any PC owned by the user A. The PC 10b is any PC owned by the user B. In one example, the electronic whiteboard 2 may have a videoconference capability, to carry out a videoconference with the videoconference terminal 13 by communicating video data and audio data through the communication network 100.

The terminal management server 5 manages, for each privately-owned terminal, terminal identification (ID) identifying the privately-owned terminal. The destination management server 6 manages an electronic mail (email) address of the PC 10 owned by each user. The mail server 7 controls transmission or reception of emails through the communication network 100. The print server 8 is a server that implements so-called secure printing. The print server 8 stores data reflecting the image data transmitted from the electronic whiteboard 2 or PC 10 (in this example, print data), and, in response to a request from the MFP 9, transmits the data reflecting the image data to the MFP 9.

<Hardware Configuration>

Referring to FIGS. 2 to 7, a hardware configuration of the apparatus or terminal in the communication system 1 is described according to the embodiment.

<Hardware Configuration of Electronic Whiteboard>

Figure 2:
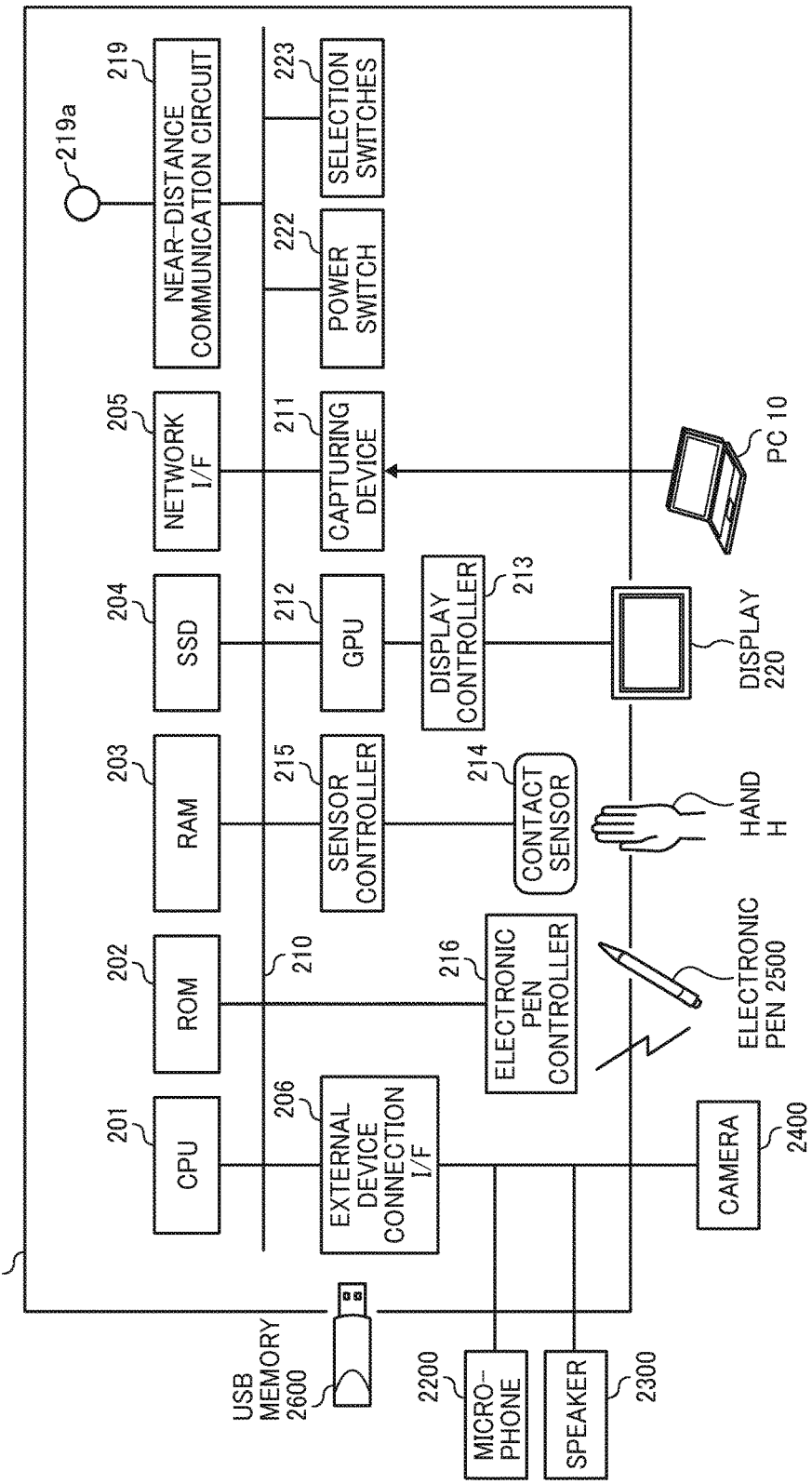
FIG. 2 is a schematic block diagram illustrating a hardware configuration of an electronic whiteboard, according to an embodiment of the present disclosure.

FIG. 2 is a diagram illustrating a hardware configuration of the electronic whiteboard 2, according to the embodiment. As illustrated in FIG. 2, the electronic whiteboard 2 includes a central processing unit (CPU) 201, a read only memory (ROM) 202, a random access memory (RAM) 203, a solid state drive (SSD) 204, a network interface (I/F) 205, and an external device connection interface (I/F) 206.

The CPU 201 controls entire operation of the electronic whiteboard 2. The ROM 202 stores programs such as an Initial Program Loader (IPL) to boot the CPU 201. The RAM 203 is used as a work area for the CPU 201. The SSD 204 stores various data such as the control program for the electronic whiteboard 2. The network I/F 205 controls communication with an external device through the communication network 100. The external device connection I/F 206 controls communication with a universal serial bus (USB) memory 2600, and external devices such as a camera 2400, a speaker 2300, a microphone 2200, etc.

The electronic whiteboard 2 further includes a capturing device 211, a graphics processing unit (GPU) 212, a display controller 213, a contact sensor 214, a sensor controller 215, an electronic pen controller 216, a near-distance communication circuit 219, an antenna 219a for the near-distance communication circuit 219, a power switch 222, and selection switches 223.

The capturing device 211 causes a display 508 of the PC 10 to display a still image or a video image based on image data. The GPU 212 is a semiconductor chip dedicated to processing a graphical image. The display controller 213 controls display of an image processed at the GPU 212 for output through the display 220 provided with the electronic whiteboard 2. The contact sensor 214 detects a touch onto the display 220 with an electronic pen 2500 or a user's hand H. The sensor controller 215 controls operation of the contact sensor 214. The contact sensor 214 senses a touch input to a specific coordinate on the display 220 using the infrared blocking system. More specifically, the display 220 is provided with two light receiving elements disposed on both upper side ends of the display 220, and a reflector frame disposed at the sides of the display 220. The light receiving elements emit a plurality of infrared rays in parallel to a surface of the display 220. The light receiving elements receive lights passing in the direction that is the same as an optical path of the emitted infrared rays, which are reflected by the reflector frame. The contact sensor 214 outputs an identifier (ID) of the infrared ray that is blocked by an object after being emitted from the two light receiving elements, to the sensor controller 215. Based on the ID of the infrared ray, the sensor controller 215 detects a specific coordinate that is touched by the object. The electronic pen controller 216 communicates with the electronic pen 2500 to detect a touch by the tip or bottom of the pen 2500 to the display 220. The near-distance communication circuit 219 is a communication circuit that communicates in compliance with the NFC, the Bluetooth, and the like. The power switch 222 is a switch for turning on or off the power of the electronic whiteboard 2. The selection switches 223 are a group of switches for adjusting brightness, hue, etc., of display on the display 220, for example.

The electronic whiteboard 2 further includes a bus line 210. The bus line 210 is an address bus or a data bus, which electrically connects the elements in FIG. 2 such as the CPU 201.

The contact sensor 214 is not limited to the infrared blocking system type, and may be a different type of detector, such as a capacitance touch panel that identifies the contact position by detecting a change in capacitance, a resistance film touch panel that identifies the contact position by detecting a change in voltage of two opposed resistance films, or an electromagnetic induction touch panel that identifies the contact position by detecting electromagnetic induction caused by contact of an object to a display. In addition or in alternative to detecting a touch by the tip or bottom of the electronic pen 2500, the electronic pen controller 216 may also detect a touch by another part of the electronic pen 2500, such as a part held by a hand of the user.

<Hardware Configuration of IC Card>

Figure 3:
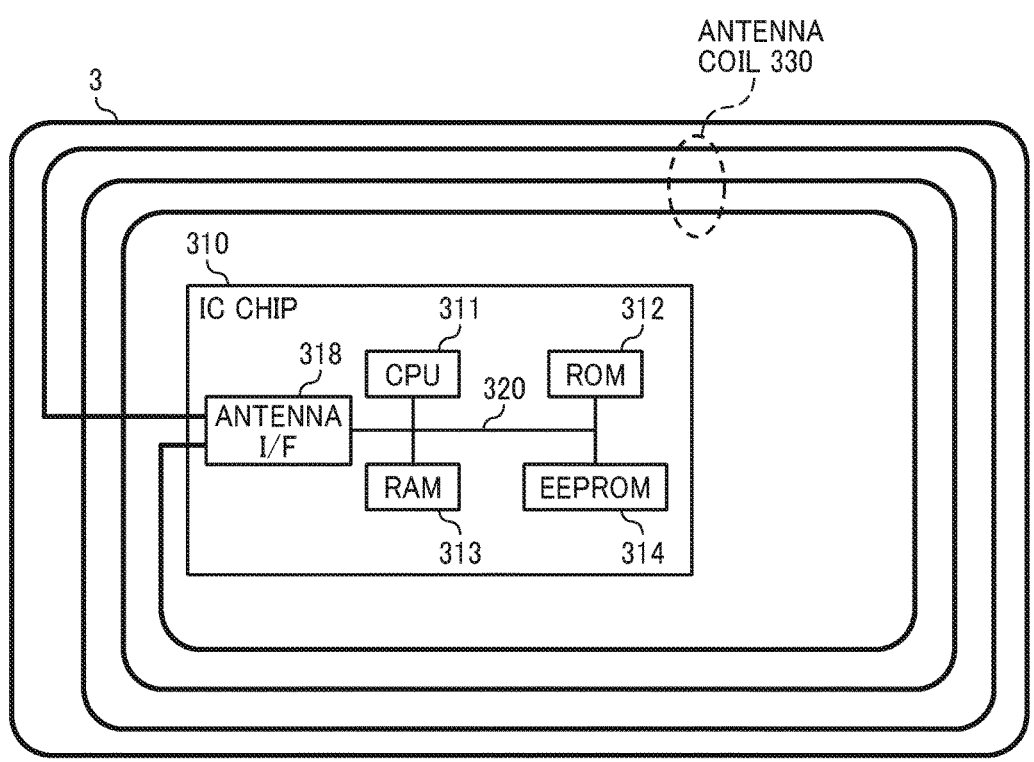
FIG. 3 is a schematic block diagram illustrating a hardware configuration of an integrated circuit (IC) card, according to an embodiment of the present disclosure.

FIG. 3 is a diagram illustrating a hardware configuration of the IC card 3 according to the embodiment. In this disclosure, the contactless IC card is described, but contact IC card may be applied instead. As illustrated in FIG. 3, the IC card 3 includes an IC chip 310 and an antenna coil 330. The IC chip 310 further includes a CPU 311, a ROM 312, a RAM 313, an Electrically Erasable and Programmable ROM (EEPROM) 314, and an antenna I/F 318.

The CPU 311 controls entire operation of the IC card 3. The ROM 312 stores a control program for operating the CPU 311. The RAM 313 is used as a work area for the CPU 311. The EEPROM 314 stores various data such as the control program for the IC card 3, and a terminal ID for identifying the IC card 3, and the like. The antenna I/F 318 controls transmission or reception of data with an external device via the antenna coil 330.

The IC card 3 further includes a bus line 320. The bus line 320 is an address bus or a data bus, which electrically connects the elements in FIG. 3 such as the CPU 311.

The antenna coil 330 generates an electric current, which is induced as the IC card 3 passes an electromagnetic field generated by radio waves emitted from an external device such as a reader and writer. The IC card 3 uses the generated electric current to activate the IC chip 310, and communicates with the external device, that is the reader and writer, to obtain or provide data with the external device.

<Hardware Configuration of Smartphone>

Figure 4:
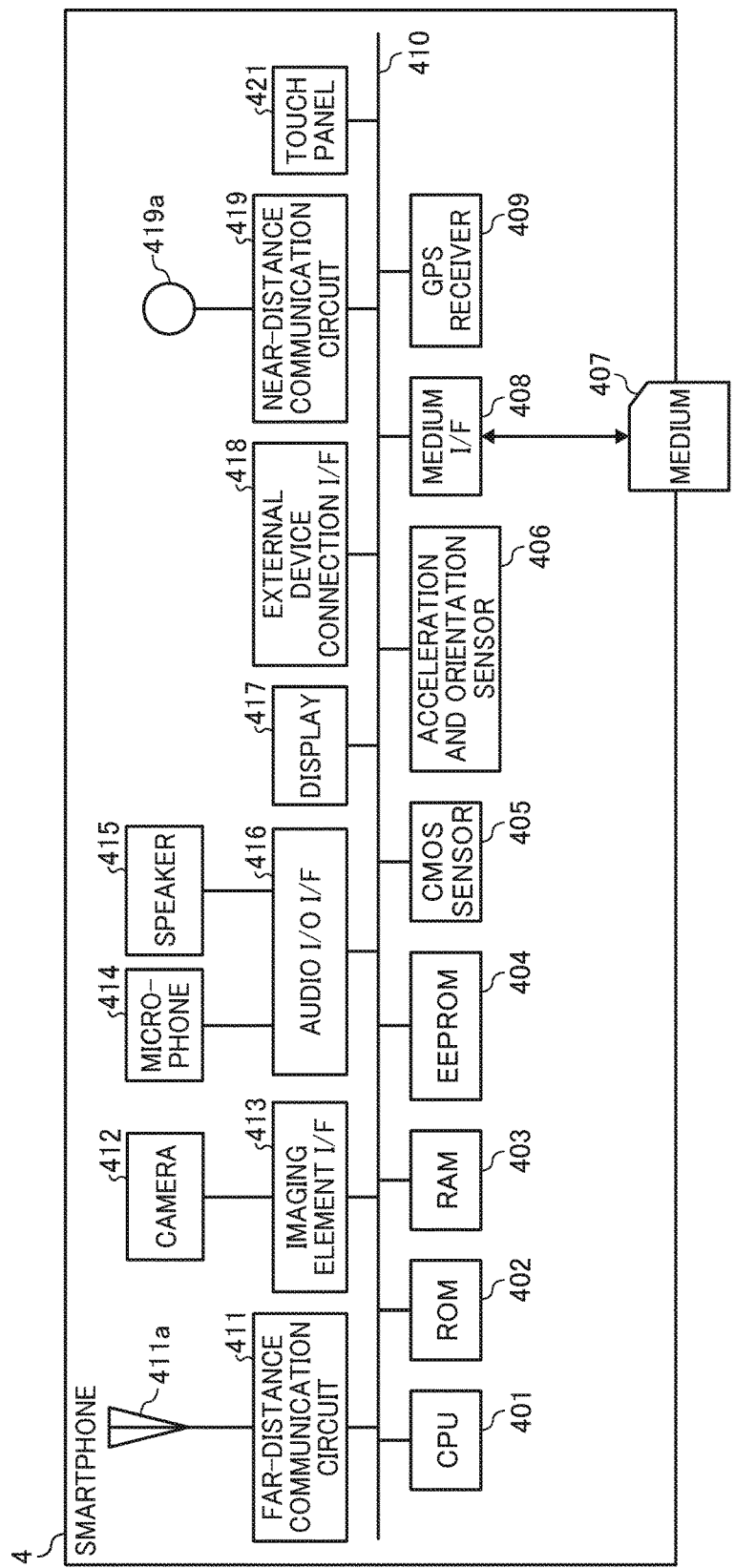
FIG. 4 is a schematic block diagram illustrating a hardware configuration of a smartphone, according to an embodiment of the present disclosure.

FIG. 4 is a diagram illustrating a hardware configuration of the smartphone 4 according to the embodiment. As illustrated in FIG. 4, the smartphone 4 includes a CPU 401, a ROM 402, a RAM 403, an EEPROM 404, a Complementary Metal Oxide Semiconductor (CMOS) sensor 405, an acceleration and orientation sensor 406, a medium I/F 408, and a global positioning system (GPS) receiver 409.

The CPU 401 controls entire operation of the smartphone 4. The ROM 402 stores programs such as an IPL to boot the CPU 401. The RAM 403 is used as a work area for the CPU 401. The EEPROM 404 reads or writes various data such as a control program for the smartphone 4 under control of the CPU 401. The CMOS sensor 405 captures an object (mainly, the user operating the smartphone 4) under control of the CPU 401 to obtain captured image data. The acceleration and orientation sensor 406 includes various sensors such as an electromagnetic compass or gyrocompass for detecting geomagnetism, and an acceleration sensor. The medium I/F 408 controls reading or writing of data with respect to a storage medium 407 such as a flash memory. The GPS receiver 409 receives a GPS signal from a GPS satellite.

The smartphone 4 further includes a far-distance communication circuit 411, a camera 412, an imaging element I/F 413, a microphone 414, a speaker 415, an audio input/output I/F 416, a display 417, an external device connection I/F 418, a near-distance communication circuit 419, an antenna 419a for the near-distance communication circuit 419, and a touch panel 421.

The far-distance communication circuit 411 is a circuit that communicates with other device through the communication network 100. The camera 412 is an example of built-in imaging device capable of capturing a subject to obtain image data under control of the CPU 401. The imaging element I/F 413 is a circuit that controls driving of the camera 412. The microphone 414 is an example of built-in audio collecting device capable of inputting audio under control of the CPU 401. The audio input/output I/F 416 is a circuit for inputting or outputting an audio signal between the microphone 414 and the speaker 415 under control of the CPU 401. The display 417 is an example of a display device, such as a liquid crystal display and an organic electroluminescence (EL) display, which displays an image of a subject, various icons, or the like. The external device connection I/F 418 is an interface circuit that connects the smartphone 4 to various external devices. The near-distance communication circuit 419 is a communication circuit that communicates in compliance with the NFC, the Bluetooth, and the like. The touch panel 421 is an example of input device that enables the user to input a user instruction to the smartphone 4 through touching a screen of the display 417.

The smartphone 4 further includes a bus line 410. The bus line 410 is an address bus or a data bus, which electrically connects the elements in FIG. 4 such as the CPU 401.

<Hardware Configuration of Server and PC>

Figure 5:
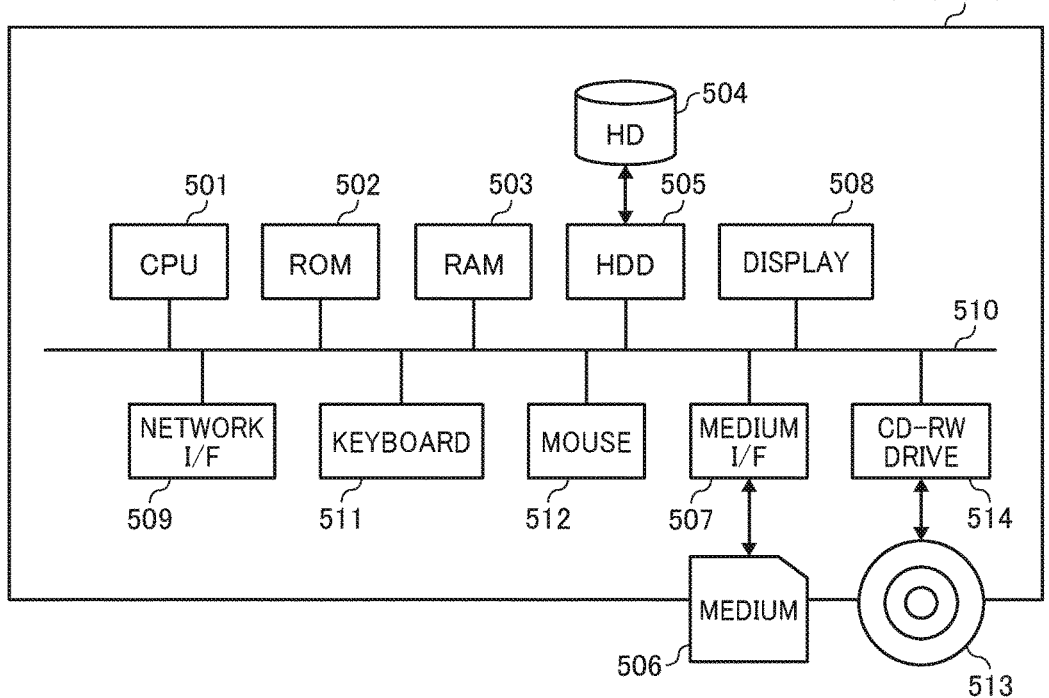
FIG. 5 is a schematic block diagram illustrating a hardware configuration of a sever or a personal computer (PC), according to an embodiment of the present disclosure.

FIG. 5 is a diagram illustrating a hardware configuration of the server and the PC, according to the embodiment. In this disclosure, since the terminal management server 5, the destination management server 6, the mail server 7, the print server 8, the PC 10a, and the PC 10b have a substantially the same hardware structure, a hardware configuration of the terminal management server 5 is described below as an example. In the following description, even in case of describing the hardware configuration of the destination management server 6, mail server 7, print server 8, PC 10a, and PC 10b, the elements in FIG. 5 are referred.

As illustrated in FIG. 5, the terminal management server 5, which may be implemented by a computer, includes a CPU 501, a ROM 502, a RAM 503, a hard disk (HD) 504, a hard disk drive (HDD) 505, a storage medium 506, a medium I/F 507, a display 508, a network I/F 509, a keyboard 511, a mouse 512, a compact disc rewritable (CD-RW) drive 514, and a bus line 510.

The CPU 501 controls entire operation of the terminal management server 5. The ROM 502 stores programs such as an IPL to boot the CPU 501. The RAM 503 is used as a work area for the CPU 501. The HD 504 stores various data such as a control program. The HDD 505 controls reading or writing of various data to or from the HD 504 under control of the CPU 501. The medium I/F 507 controls reading or writing of data with respect to the storage medium 506 such as a flash memory. The display 508 displays various information such as a cursor, menu, window, characters, or image. The network I/F 509 is an interface that controls communication of data with an external device through the communication network 100. The keyboard 511 is one example of input device provided with a plurality of keys for allowing a user to input characters, numerals, or various instructions. The mouse 512 is one example of input device for allowing the user to select a specific instruction or execution, select a target for processing, or move a cursor being displayed. The CD-RW drive 514 reads or writes various data with respect to a removable recording medium 513, such as a CD-RW or compact disc read only memory (CD-ROM).

The terminal management server 5 further includes a bus line 510. The bus line 510 may be an address bus or a data bus, which electrically connects various elements such as the CPU 501 of FIG. 5.

<Hardware Configuration of MFP>

Figure 6:
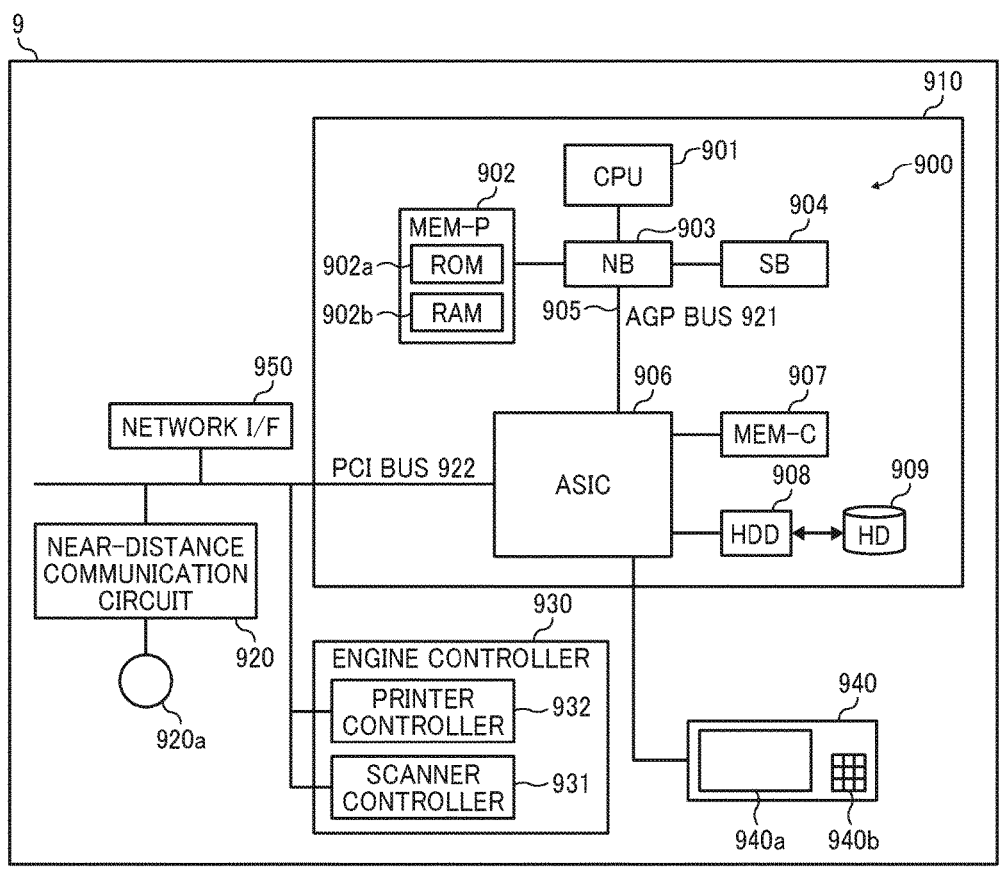
FIG. 6 is a schematic block diagram illustrating a hardware configuration of a multifunctional peripheral, product or printer (MFP), according to an embodiment of the present disclosure.

FIG. 6 is a diagram illustrating a hardware configuration of the MFP 9, according to the embodiment. As illustrated in FIG. 6, the MFP 9 includes a controller 910, a near-distance communication circuit 920, an engine controller 930, a control panel 940, and a network I/F 950.

The controller 910 includes a CPU 901 as a main processor, a system memory (MEM-P) 902, a north bridge (NB) 903, a south bridge (SB) 904, an Application Specific Integrated Circuit (ASIC) 906, a local memory (MEM-C) 907, an HDD 908, and an HD 909 as a storage unit. The NB 903 and the ASIC 906 are connected through an Accelerated Graphics Port (AGP) bus 921.

The CPU 901 controls entire operation of the MFP 9. The NB 903 connects the CPU 901, with the MEM-P 902, SB 904, and AGP bus 921. The NB 903 includes a memory controller for controlling reading or writing of various data with respect to the MEM-P 902, a Peripheral Component Interconnect (PCI) master, and an AGP target.

The MEM-P 902 includes a ROM 902a as a memory that stores program and data for implementing various functions of the controller 910. The MEM-P 902 further includes a RAM 902b as a memory that deploys the program and data, or as a drawing memory that stores drawing data for printing. The program stored in the RAM 902b may be stored in any computer-readable storage medium, such as a CD-ROM, floppy disk (FD), compact disc-recordable (CD-R), or digital versatile disc (DVD), in a file format installable or executable by the computer, for distribution.

The SB 904 connects the NB 903 with a PCI device or a peripheral device. The ASIC 906 is an integrated circuit (IC) dedicated to an image processing use, and connects the AGP bus 921, a PCI bus 922, the HDD 908, and the MEM-C 907. The ASIC 906 includes a PCI target, an AGP master, an arbiter (ARB) as a central processor of the ASIC 906, a memory controller for controlling the MEM-C 907, a plurality of direct memory access controllers (DMACs) capable of converting coordinates of image data with a hardware logic, and a PCI unit that transfers data between a scanner controller 931 and a printer controller 932 through the PCI bus 922. The ASIC 906 may be connected to a USB interface, or the Institute of Electrical and Electronics Engineers 1394 (IEEE1394) interface.

The MEM-C 907 is a local memory, which is used as a buffer for image data to be copied or code image. The HD 909 stores various image data, font data for printing, and form data. The HDD 908 reads or writes various data from or to the HD 909 under control of the CPU 901. The AGP bus 921 is a bus interface for a graphics accelerator card, which has been proposed to accelerate graphics processing. Through directly accessing the MEM-P 902 by high-throughput, the graphics accelerator card is accelerated.

The near-distance communication circuit 920 is provided with an antenna 920a. The near-distance communication circuit 920 is a communication circuit that communicates in compliance with the NFC, the Bluetooth, and the like.

The engine controller 930 includes the scanner controller 931 and the printer controller 932. The control panel 940 includes a panel display 940a and various keys 940b. The panel display 940a is implemented by, for example, a touch panel that displays current settings or a selection screen, and receives a user input. The keys 940b, which include a numeric keypad that receives set values of various image forming parameters such as image density parameter, and a start key that accepts an instruction for starting copying. The controller 910 controls entire operation of the MFP 9. In example operation, the controller 910 controls drawing, communication, or user inputs to the control panel 940. The scanner controller 931 and the printer controller 932 each performs various image processing, such as error diffusion or gamma conversion.

In response to an instruction to select a specific application through the control panel 940, for example, using a mode switch key, the MFP 9 selectively performs a document box function, a copy function, a print function, and a facsimile function. When the document box function is selected, the MFP 9 changes its operating mode to a document box mode to store document data. With selection of the copy function, the MFP 9 operates in a copy mode. With selection of the print function, the MFP 9 operates in a printer mode. With selection of the facsimile function, the MFP 9 operates in a facsimile mode.

The network I/F 950 controls communication of data with an external device through the communication network 100. The near-distance communication circuit 920 and the network I/F 950 are electrically connected to the ASIC 906 via the PCI bus 922.

<Hardware Configuration of Videoconference Terminal>

FIG. 7 is a diagram illustrating a hardware configuration of the videoconference terminal 13 according to the embodiment. As illustrated in FIG. 7, the videoconference terminal 13 includes a CPU 101, a ROM 102, a RAM 103, a flash memory 104, an SSD 105, a medium I/F 107, an operation key 108, a power switch 109, a bus line 110, a network I/F 111, a camera 112, an imaging element I/F 113, a microphone 114, a speaker 115, an audio input/output I/F 116, a display I/F 117, an external device connection I/F 118, a near-distance communication circuit 119, and an antenna 119a for the near-distance communication circuit 119. The CPU 101 controls entire operation of the videoconference terminal 13. The ROM 102 stores programs such as an IPL to boot the CPU 101. The RAM 103 is used as a work area for the CPU 101. The flash memory 104 stores various data such as a communication control program, image data, and audio data. The SSD 105 controls reading or writing of various data to or from the flash memory 104 under control of the CPU 101. In alternative to the SSD, a hard disk drive (HDD) may be used. The medium I/F 107 controls reading or writing of data with respect to a storage medium 106 such as a flash memory. The operation key (keys) 108 is operated by a user to input a user instruction such as a user selection of a communication destination of the videoconference terminal 13. The power switch 109 is a switch that turns on or off the power of the videoconference terminal 13.

The network I/F 111 allows communication of data with an external device through the communication network 100 such as the Internet. The camera 112 is an example of built-in imaging device capable of capturing a subject to obtain image data under control of the CPU 101. The imaging element I/F 113 is a circuit that controls driving of the camera 112. The microphone 114 is an example of built-in audio collecting device capable of inputting audio under control of the CPU 101. The audio input/output I/F 116 is a circuit for inputting and outputting an audio signal between the microphone 114 and the speaker 115 under control of the CPU 101. The display I/F 117 is a circuit for transmitting image data to an external display 120 under control of the CPU 101. The external device connection I/F 118 is an interface circuit that connects the videoconference terminal 13 to various external devices. The near-distance communication circuit 119 is a communication circuit that communicates in compliance with the NFC, the Bluetooth, and the like.

The bus line 110 may be an address bus or a data bus, which electrically connects various elements such as the CPU 101 of FIG. 7.

The display 120 is an example of a display device, such as a liquid crystal display or organic electroluminescence (EL) display, which displays an image of a subject, an operation icon, or the like. The display 120 is connected to the display I/F 117 by the cable 120c. The cable 120c may be an analog red green blue (RGB) (video graphic array (VGA)) signal cable, a component video cable, a high-definition multimedia interface (HDMI) (registered trademark) signal cable, or a digital video interactive (DVI) signal cable.

The camera 112 includes a lens and a solid-state imaging element that converts an image (video) of a subject to electronic data by converting light to electric charge. As the solid-state imaging element, for example, a complementary metal-oxide-semiconductor (CMOS) or a charge-coupled device (CCD) is used. The external device connection I/F 118 is capable of connecting an external device such as an external camera, an external microphone, or an external speaker through a USB cable or the like. In a case in which an external camera is connected, the external camera is driven in preference to the built-in camera 112 under control of the CPU 101. Similarly, in a case in which an external microphone is connected or an external speaker is connected, the external microphone or the external speaker is driven in preference to the built-in microphone 114 or the built-in speaker 115 under control of the CPU 101.

The storage medium 106 is removable from the videoconference terminal 13. The storage medium 106 can be any nonvolatile memory that reads or writes data under control of the CPU 101, such that any memory such as an EEPROM may be used instead of the flash memory 104.

<Example Screens of Electronic Whiteboard>

Figure 8A:
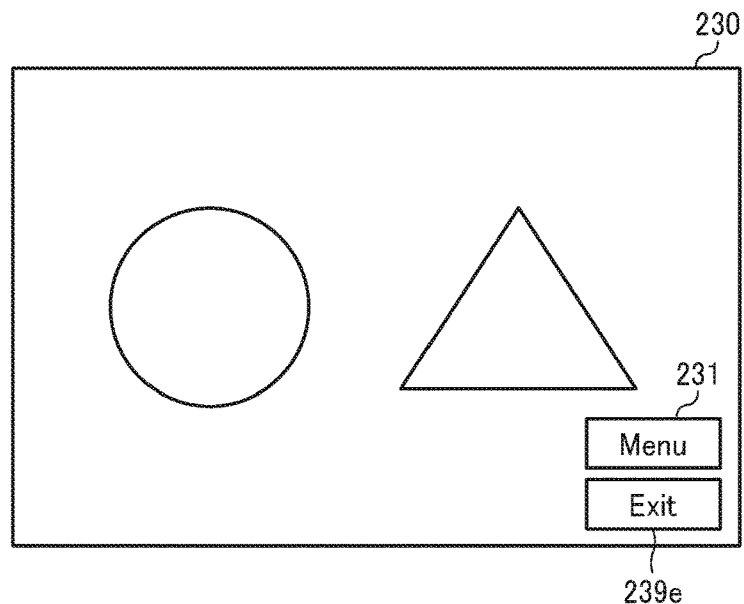
FIGS. 8A, 8B, and 8C each illustrates an example screen displayed by a display at the electronic whiteboard according to an embodiment of the present disclosure.
Figure 8B:
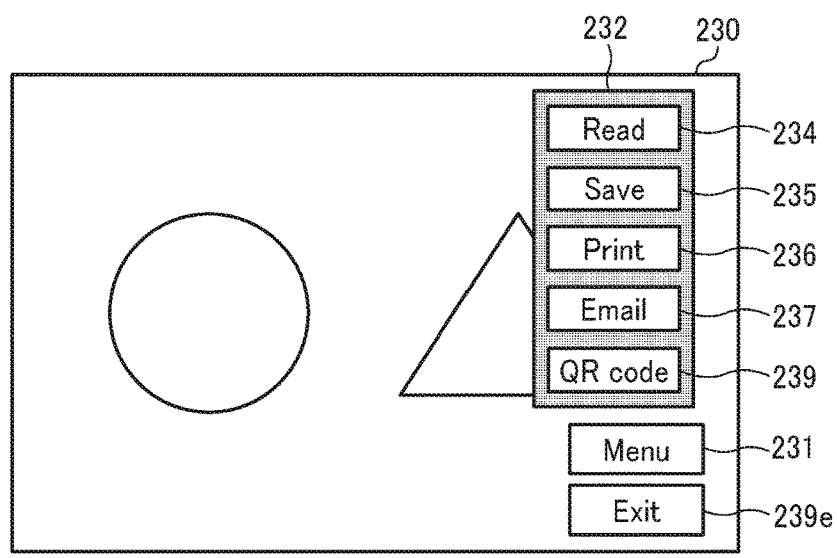

Referring to FIGS. 8A to 8C, FIGS. 9A to 9D, and FIGS. 10A to 10D, example screens of the electronic whiteboard 2 are described according to the embodiment. FIGS. 8A to 8C, FIGS. 9A to 9D, and FIGS. 10A to 10D each illustrates a screen displayed on the display 220 of the electronic whiteboard 2. The electronic whiteboard 2 displays, on the display 220, a drawing image screen 230 as illustrated in FIG. 8A, for example. The drawing image screen 230 displays a drawing image (such as a circle and a triangle in the figure) drawn by the user with such as the electronic pen 2500. The drawing image screen 230 displays a "Menu" button 231 and an "Exit" button 239e at the lower right. The "Menu" button 231 is a graphical image, which, when selected by the user, causes the electronic whiteboard 2 to perform various types of functions of the electronic whiteboard 2. The "Exit" button 239e is a graphical image, which, when selected, enables the user to log out from the electronic whiteboard 2 and causes the electronic whiteboard 2 to finish displaying a screen. When the user presses the "Menu" button 231 with such as the electronic pen 2500, as illustrated in FIG. 8B, the electronic whiteboard 2 displays, on the drawing image screen 230, a menu selection window (image) 232 for allowing selection of a function provided by the electronic whiteboard 2.

As illustrated in FIG. 8B, the menu selection window 232 includes a "Read" button 234, a "Save" button 235, a "Print" button 236, an "Email" button 237, and a "QR code" button 239.

Of those buttons, the "Read" button 234 is a graphical image, which, when selected, causes the electronic whiteboard 2 to read drawing image data that is stored in the SSD 204 after the image is drawn, for display onto the display 220. The "Save" button 235 is a graphical image, which, when selected, causes the electronic whiteboard 2 to store the drawing image drawn by the user in the SSD 204 as the drawing image data. The "Print" button 236 is a graphical image, which, when selected, causes the electronic whiteboard 2 to print the drawing image displayed on the drawing image screen 230 using such as the MFP 9. The "Email" button 237 is a graphical image, which, when selected, causes the electronic whiteboard 2 to transmit, to the PC 10a or the PC 10b, etc., the drawing image displayed on the drawing image screen 230, as the drawing image data attached to the email. The "QR code" button 239 is a graphical image, which, when selected, causes the electronic whiteboard 2 to display, on the display 220, a QR code (registered trademark) embedded with a device ID identifying the own device (that is, the electronic whiteboard 2).

Next, example screens to be displayed by the electronic whiteboard 2 when the buttons 234 to 237 and 239 are respectively selected, are described.

In response to pressing of the "Read" button 234 by the user, the electronic whiteboard 2 controls the display 220 to display a folder selection screen 240 as illustrated in FIG. 9A. The folder selection screen 240 displays a plurality of folder icons to be used for selecting a folder storing an electronic file to be read. When the user selects a desired folder icon ("folder 01", for example) with the electronic pen 2500, the electronic whiteboard 2 displays, on the display 220, a file selection screen 245 as illustrated in FIG. 9B. The file selection screen 245 displays a plurality of file icons to be used for selecting an electronic file to be read. When the user selects a desired file icon with the electronic pen 2500, the electronic whiteboard 2 displays, on the display 220, a drawing image screen 230 including a drawing image relating to data of the selected file, as illustrated in FIG. 8A.

Figure 9D:
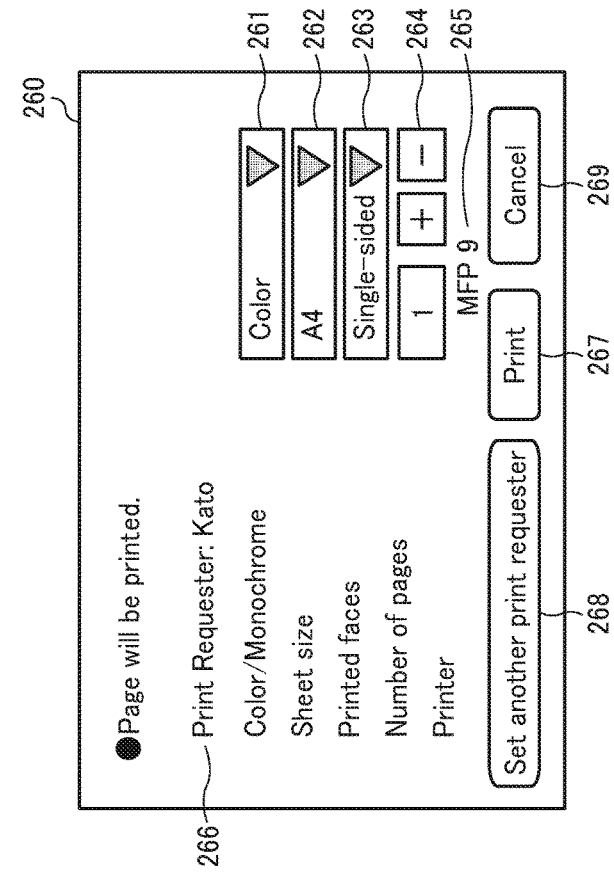
Figure 9C:
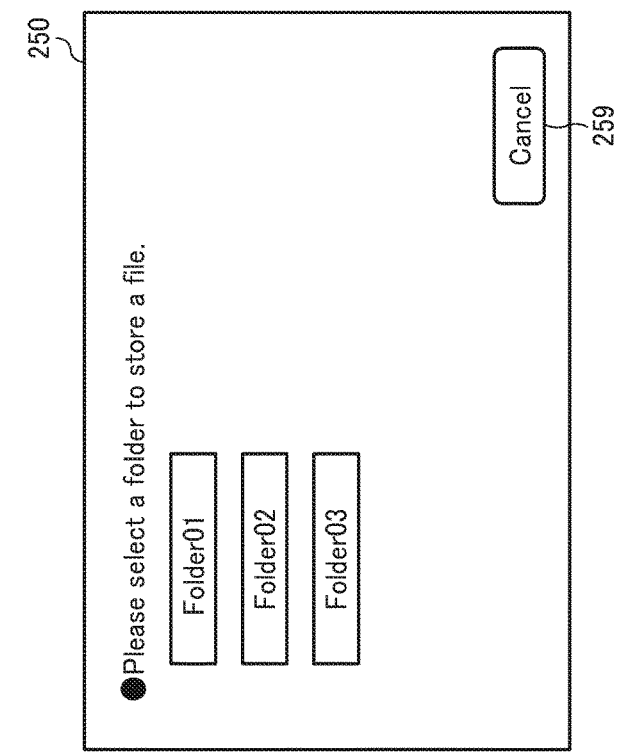

In response to pressing of the "Save" button 235 by the user, the electronic whiteboard 2 controls the display 220 to display a folder selection screen 250 as illustrated in FIG. 9C. The folder selection screen 250 displays a plurality of folder icons to be used for selecting a folder to store an electronic file. The user selects the folder to store the electronic file, by selecting a desired folder icon with the electronic pen 2500.

In response to pressing of the "Print" button 236 by the user, the electronic whiteboard 2 controls the display 220 to display a print configuration screen 260 as illustrated in FIG. 9D. The print configuration screen 260 displays a print requester field 266, and various types of print parameters. In this disclosure, a user name of the user who has logged in is displayed as a print requester name in the print requester field 266. The various types of print parameters are indicated by menus 261 to 264, respectively, for selecting color or monochrome printing, selecting a sheet size (A4, A3, etc.), selecting faces to be printed (single-sided or duplex), and selecting the increase or decrease of the number of pages to be printed. The print configuration screen 260 further displays, in a field 265, a device name identifying a printer to print (in this example, "MFP 9"). The print configuration screen 260 further displays a "Print" button 267 to be pressed by the user to start printing. For each of the screens illustrated in FIGS. 9A, 9B, 9C, and 9D, "Cancel" buttons 249, 259, and 269 are displayed to return to the drawing image screen 230 illustrated in FIG. 8A.

Figure 10B:
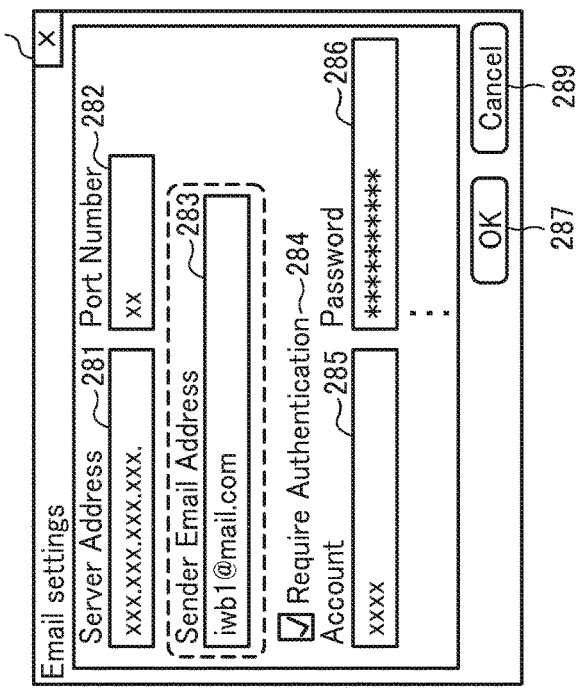
FIGS. 10A, 10B, 10C, and 10D each illustrates an example screen displayed by the display at the electronic whiteboard according to an embodiment of the present disclosure.
Figure 10A:
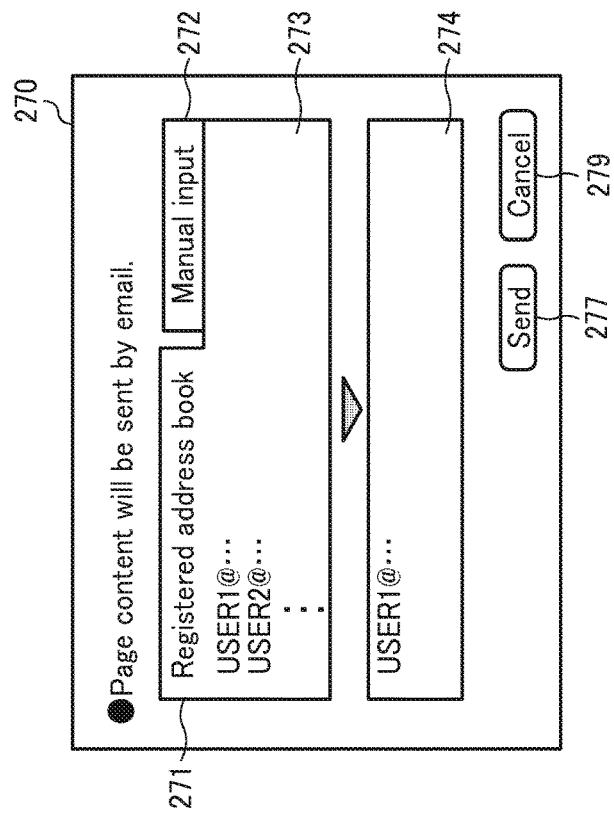

In response to pressing the "Email" button 237 by the user, a display control 24 of the electronic whiteboard 2 controls the display 220 to display a destination configuration screen 270 as illustrated in FIG. 10A. The destination configuration screen 270 includes a "Registered address book" tab 271 for showing registered email addresses, and a "Manual input" tab 272 for allowing the user to manually input an email address with such as the electronic pen 2500. In this example, a case where the "Registered address book" tab 271 is selected is displayed. The destination configuration screen 270 displays a registered address book field 273 that lists the registered email addresses. The destination configuration screen 270 further displays, below the registered address book field 273, an address configuration field 274 that lists one or more email addresses, each representing a destination to which an email is actually sent. At the time when the destination configuration screen 270 is displayed, an email address of the user who has logged in is displayed in the address configuration field 274. In this example, an email address of the user A (e.g., "USER1@ . . . ") is displayed, which is transmitted at S19 as described later when the user A logs in the electronic whiteboard 2. The destination configuration screen 270 further displays a "Send" button 277 to be selected by the user to start transmission of email.

In another example, the electronic whiteboard 2 may display, on the display 220, an email configuration screen 280 as illustrated in FIG. 10B, as a screen to be displayed to an administrator or a service engineer, but not to the general user. The email configuration screen 280 includes a server address field 281, a port number field 282, a sender email address field 283, an authentication requirement field 284, an account field 285, and a password field 286.

The server address field 281 is a field to be entered with an IP address of the mail server 7. The port number field 282 is a field to be entered with a port number of a port that the mail server 7 opens to accept emails. The sender email address field 283 is previously set with an email address assigned to the electronic whiteboard 2, as the electronic whiteboard 2 is an email sender. That is, the email sender is not a user operating the electronic whiteboard 2, but is previously set as the electronic whiteboard 2. The authentication requirement field 284 is a field to be set with information indicating whether or not to request the mail server 7 to authenticate the email sender. The account field 285 and the password field 286 are entered with account information, which is to be used by the mail server 7 to authenticate the electronic whiteboard 2 using Send Mail Transfer Protocol (SMTP).

Figure 10D:
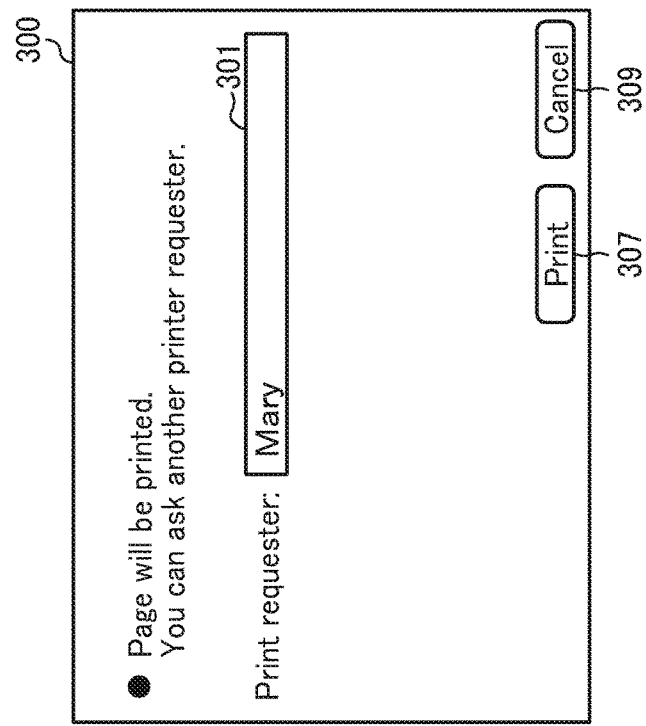
Figure 10C:
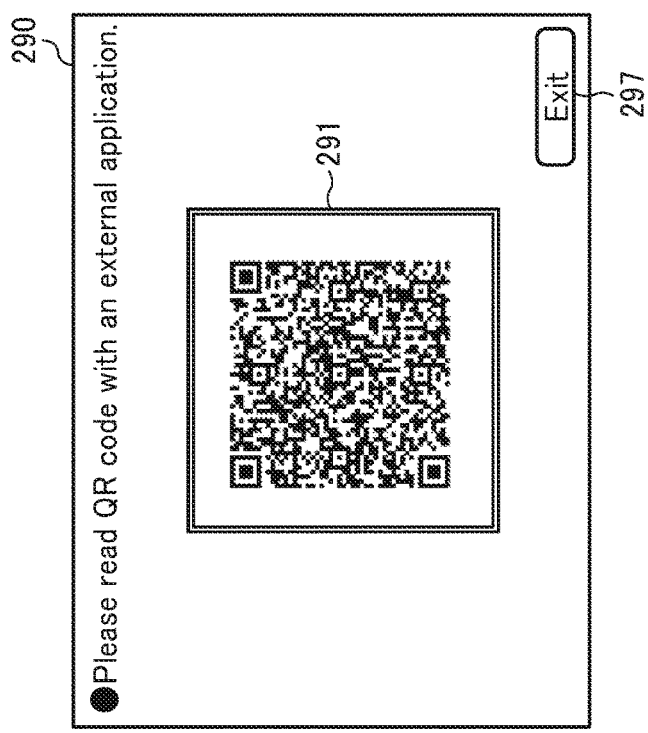

In response to pressing of the "QR code" button 239 by the user, the electronic whiteboard 2 controls the display 220 to display a QR code display screen 290 as illustrated in FIG. 10C. The QR code display screen 290 displays a QR code 291 embedded with the device ID for identifying the electronic whiteboard 2 (the own device). For example, the user activates a QR code reader application installed on such as the smartphone, to cause the activated reader application to read the QR code 291 to obtain the device ID of the electronic whiteboard 2. The QR code display screen 290 further includes an "Exit" button 297, which switches back from the QR code display screen 290 to the drawing image screen 230. For each of the screens illustrated in FIGS. 10A and 10B, "Cancel" buttons 279 and 289 are displayed to return to the drawing image screen 230 illustrated in FIG. 8A.

Figure 8C:
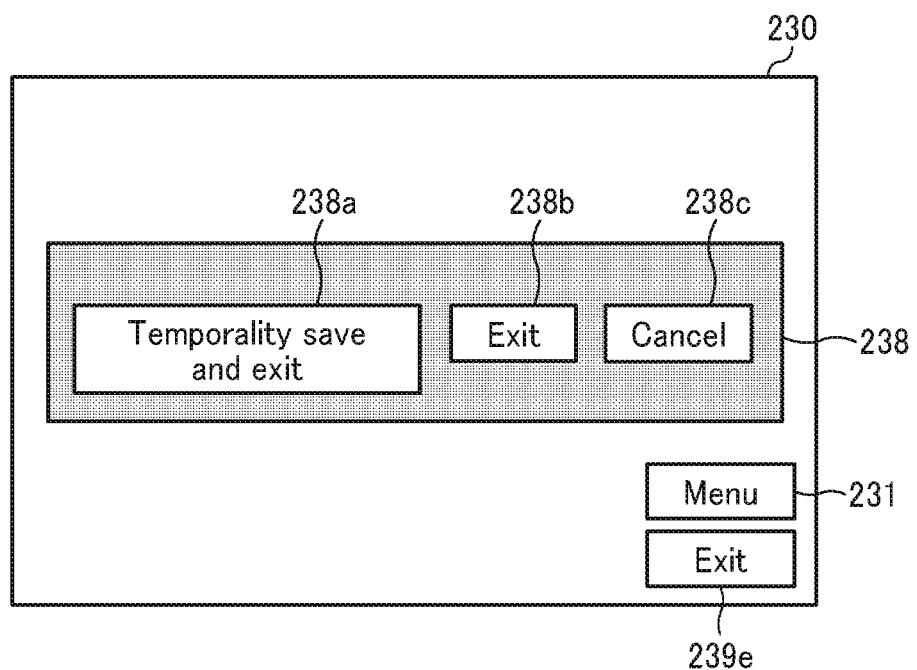

By contrast, referring again to FIG. 8A, when the user presses the "Exit" button 239e with such as the electronic pen 2500, the electronic whiteboard 2 displays, on the drawing image screen 230, an exit window 238 for logging out and finishing the display, as illustrated in FIG. 8C.

As illustrated in FIG. 8C, the exit window 238 includes a "Temporarily save and exit" button 238a, an "Exit" button 238b, and a "Cancel" button 238c.

The "Temporarily save and exit" button 238a is a graphical image, which, when selected, causes the electronic whiteboard 2 to temporarily store the drawing image data, allows the user to log out from the electronic whiteboard 2, and causes the electronic whiteboard 2 to finish displaying. The "Exit" button 238b is a graphical image, which, when selected, allows the user to log out from the electronic whiteboard 2, and causes the electronic whiteboard 2 to finish displaying, without temporarily storing the drawing image data. In other words, when the "Exit" button 238b is selected, an image represented by the drawing image data is not to be displayed (redisplayed) the next time when the user logs in the electronic whiteboard 2. The "Cancel" button 238c is a graphical image, which, when selected, causes the electronic whiteboard 2 to finish displaying of the exit window 238 and return to the drawing image screen 230 illustrated in FIG. 8A.

Any one of the IDs described above is an example of identification information identifying the device or terminal, or the user operating the device or terminal. The device ID is an example of device identification information. The terminal ID is an example of terminal identification information. The user ID is an example of user identification information. Further, the device identification information and the terminal identification information include a production serial number. Furthermore, the user identification information includes an employee number, a driver license number, and an individual number called "My Number" under the Japan's Social Security and Tax Number System.

Further, any one of the above-described control programs may be recorded in a file in a format installable or executable on a computer-readable storage medium for distribution. Examples of the storage medium include, but not limited to, a CD-R, DVD, blue-ray disc, and SD card. In addition, such storage medium may be provided in the form of a program product to users within a certain country or outside that country.

Each of the servers 5, 6, 7, and 8 may be configured by a single computer or a plurality of computers to which divided portions (functions, means, or storages) are arbitrarily allocated.

<Functional Configuration of Communication System>

Figure 11B:
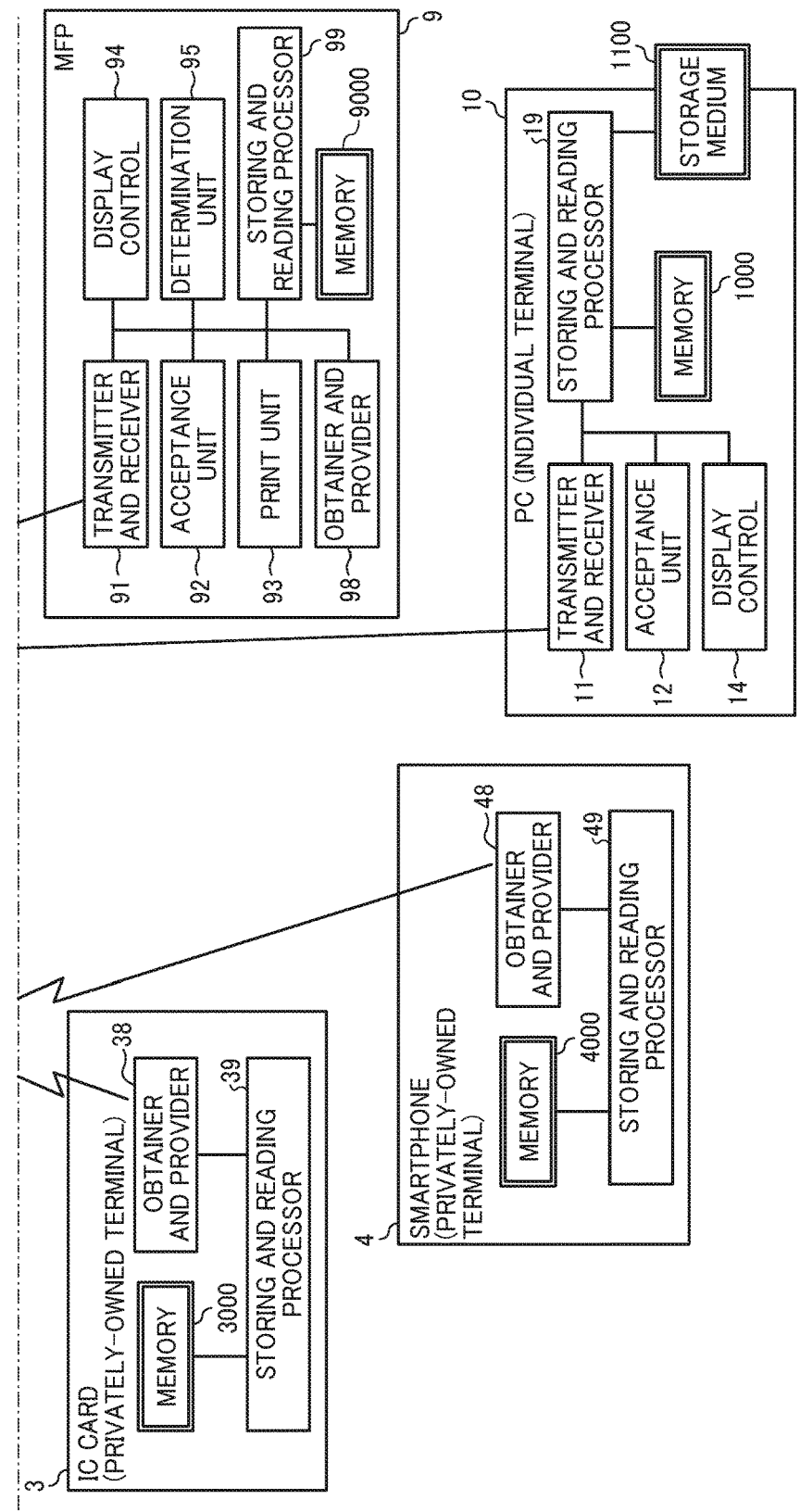

Referring to FIGS. 11A and 11B and FIGS. 12A to 12C, a functional configuration of the communication system 1 is described according to the embodiment. FIGS. 11A and 11B are a diagram illustrating a functional configuration of the communication system 1. In FIGS. 11A and 11B, only a part of those terminals, devices, and servers illustrated in FIG. 1 is illustrated, which relates to processing or operation described below.

<Functional Configuration of Electronic Whiteboard>

As illustrated in FIG. 11A, the electronic whiteboard 2 includes a transmitter and receiver 21, an acceptance unit 22, an image and audio processor 23, a display control 24, a determination unit 25, a first generator 26a, a second generator 26b, a setting unit 27, an obtainer and provider 28, and a storing and reading processor 29. These units are functions that are implemented by or that are caused to function by operating any of the elements illustrated in FIG. 2 in cooperation with the instructions of the CPU 201 according to the electronic whiteboard control program expanded from the SSD 204 to the RAM 203. The electronic whiteboard 2 further includes a memory 2000, which is implemented by the RAM 203 and SSD 204 illustrated in FIG. 2.

(Each Functional Unit of Electronic Whiteboard)

Next, each functional unit of the electronic whiteboard 2 is described according to the embodiment. The transmitter and receiver 21, which may be implemented by the instructions of the CPU 201, the network I/F 205, and the external device connection I/F 206, illustrated in FIG. 2, transmits or receives various types of data (or information) to or from other terminal, apparatus, or system through the communication network 100.

The acceptance unit 22, which is implemented by the instructions of the CPU 201, the contact sensor 214, and the electronic pen controller 216, illustrated in FIG. 2, accepts various inputs from the user.

The image and audio processor 23, which is implemented by the instructions of the CPU 201, illustrated in FIG. 2, applies image processing to image data that is obtained by capturing a subject by the camera 2400. After the audio of the user is converted to an audio signal by the microphone 2200, the image and audio processor 23 applies processing to audio data according to this audio signal. The image and audio processor 23 outputs the audio signal according to the audio data to the speaker 2300, and the speaker 2300 outputs audio. The image and audio processor 23 obtains drawing image data, drawn by the user with the electronic pen 2500 or the user's hand H onto the display 220, and converts the drawing image data to coordinate data. For example, when the electronic whiteboard 2x transmits the coordinate data to the electronic whiteboard 2y at another site, the electronic whiteboard 2y controls the display 220 of the electronic whiteboard 2y to display a drawing image having the same content based on the received coordinate data.

The display control 24, which is implemented by the instructions of the CPU 201 illustrated in FIG. 2 and by the display controller 213 illustrated in FIG. 2, controls the display 220 to display a drawing image.

The determination unit 25, which is implemented by the instructions of the CPU 201 illustrated in FIG. 2, determines whether the electronic whiteboard 2 has received any terminal ID, for example, from the IC card 3 or the smartphone 4.

The first generator 26a, which is implemented by the instructions of the CPU 201 illustrated in FIG. 2, generates image data in PDF, from the drawing image data in bitmap that has been generated based on drawing by the user. The second generator 26b, which is implemented by the instructions of the CPU 201 illustrated in FIG. 2, generates image data in RPCS, from the drawing image data in bitmap that has been generated based on drawing by the user. The image data may be in any suitable format other than RPCS, such as in PDL or PS.

The setting unit 27, which is implemented by the instructions of the CPU 201 illustrated in FIG. 2, configures settings such as an email sender, an email destination, or a print requester name of a user who requests printing in accordance with print data.

The obtainer and provider 28, which is implemented by the instructions of the CPU 201 and the near-distance communication circuit 219 with the antenna 219a, illustrated in FIG. 2, communicates with the IC card 3 or the smartphone 4 to obtain or provide data from or to the IC card 3 or the smartphone 4 by near-distance communication.

The storing and reading processor 29, which is implemented by the instructions of the CPU 201 and the SSD 204 illustrated in FIG. 2, performs processing to store various types of data in the memory 2000 or a storage medium 2100 or to read various types of data stored in the memory 2000 or the storage medium 2100. Further, every time image data and audio data are received in performing communication with other electronic whiteboard or videoconference terminal, the memory 2000 overwrites the image data and audio data. The display 220 displays an image based on image data before being overwritten, and the speaker 2300 outputs audio based on audio data before being overwritten. The storage medium 2100 is implemented by the USB memory 2600 illustrated in FIG. 2.

<Functional Configuration of IC Card>

As illustrated in FIG. 11B, the IC card 3 includes an obtainer and provider 38, and a storing and reading processor 39. These units are functions that are implemented by or that are caused to function by operating any of the elements illustrated in FIG. 3 in cooperation with the instructions of the CPU 311 according to the IC card control program expanded from the EEPROM 314 to the RAM 313. The IC card 3 further includes a memory 3000, which is implemented by the RAM 313 and the EEPROM 314 illustrated in FIG. 3.

(Each Functional Unit of IC Card)

Next, each functional unit of the IC card 3 is described according to the embodiment. The obtainer and provider 38, which is implemented by the instructions of the CPU 311 and the antenna coil 330 illustrated in FIG. 3, communicates with the electronic whiteboard 2 to obtain or provide data from or to the electronic whiteboard 2 by near-distance communication.

The storing and reading processor 39, which is implemented by the instructions of the CPU 311 illustrated in FIG. 3, performs processing to store various types of data in the memory 3000 or read various types of data stored in the memory 3000. The memory 3000 stores a terminal ID for identifying the IC card as one example of privately-owned terminal.

<Functional Configuration of Smartphone>

As illustrated in FIG. 11B, the smartphone 4 includes an obtainer and provider 48 and a storing and reading processor 49. These units are functions that are implemented by or that are caused to function by operating any of the elements illustrated in FIG. 4 in cooperation with the instructions of the CPU 401 according to the smartphone control program expanded from the EEPROM 404 to the RAM 403. The smartphone 4 further includes a memory 4000, which is implemented by the RAM 403 and the EEPROM 404 illustrated in FIG. 4.

(Each Functional Unit of Smartphone)

Next, each functional unit of the smartphone 4 is described according to the embodiment. The obtainer and provider 48, which is implemented by the instructions of the CPU 401 and the near-distance communication circuit 419 with the antenna 419a, illustrated in FIG. 4, communicates with the electronic whiteboard 2 to obtain or provide data from or to the electronic whiteboard 2 by near-distance communication.

The storing and reading processor 49, which is implemented by the instructions of the CPU 401 illustrated in FIG. 4, performs processing to store various types of data in the memory 4000 or read various types of data stored in the memory 4000. The memory 4000 stores a terminal ID for identifying the smartphone 4 as one example of privately-owned terminal.

<Functional Configuration of Terminal Management Server>

The terminal management server 5 includes a transmitter and receiver 51, an authenticator 52, and a storing and reading processor 59. These units are functions that are implemented by or that are caused to function by operating any of the elements illustrated in FIG. 5 in cooperation with the instructions of the CPU 501 according to the terminal control program expanded from the HD 504 to the RAM 503. The terminal management server 5 includes a memory 5000, which is implemented by the HD 504 illustrated in FIG. 5.

(Terminal Management Table)

FIG. 12A is a conceptual diagram illustrating a terminal management table according to the embodiment. The memory 5000 stores a terminal management DB 5001, which is implemented by the terminal management table illustrated in FIG. 12A. This terminal management table stores, for each one of a plurality of privately-owned terminals (IC card 3, smartphone 4) registered to the terminal management server 5, a user ID identifying a user who owns the privately-owned terminal and a user name in association with the terminal ID identifying the privately-owned terminal.

(Each Functional Unit of Terminal Management Server)

Next, each functional unit of the terminal management server 5 is described in detail according to the embodiment. In the following description of the functional configuration of the terminal management server 5, relationships of one or more hardware elements in FIG. 5 with each functional unit of the terminal management server 5 in FIG. 9 will also be described.

The transmitter and receiver 51 of the terminal management server 5 illustrated in FIG. 11A, which is implemented by the instructions of the CPU 501 illustrated in FIG. 5 and by the network I/F 509 illustrated in FIG. 5, transmits or receives various types of data (or information) to or from another terminal, device, or system via the communication network 100.

The authenticator 52, which is implemented by the instructions of the CPU 501 illustrated in FIG. 5, determines whether a terminal ID transmitted from the electronic whiteboard 2 is a privately-owned terminal (IC card 3, smartphone 4) owned by the authorized user, which is previously registered.

The storing and reading processor 59, which is implemented by the instructions of the CPU 501 illustrated in FIG. 5 and the HDD 505 illustrated in FIG. 5, performs processing to store various types of data in the memory 5000 or read various types of data stored in the memory 5000.

<Functional Configuration of Destination Management Server>

The destination management server 6 includes a transmitter and receiver 61, and a storing and reading processor 69. These units are functions that are implemented by or that are caused to function by operating any of the elements illustrated in FIG. 5 in cooperation with the instructions of the CPU 501 according to the destination management program expanded from the HD 504 to the RAM 503. The destination management server 6 further includes a memory 6000, which is implemented by the HD 504 illustrated in FIG. 5.

(Destination Management Table)

FIG. 12B is a conceptual diagram illustrating a destination management table according to an embodiment. The memory 6000 stores a destination management DB 6001, which is implemented by the destination management table illustrated in FIG. 12B. The destination management table stores, for each of one or more registered users being managed by the destination management server 6, a user ID identifying the user and an email address of the PC 10 of the user, in association with each other.

(Each Functional Unit of Destination Management Server)

Next, each functional unit of the destination management server 6 is described in detail according to the embodiment. In the following description of the functional configuration of the destination management server 6, relationships of the hardware elements in FIG. 5 with each functional unit of the destination management server 6 in FIG. 11A will also be described.

The transmitter and receiver 61 of the destination management server 6 illustrated in FIG. 11A, which is implemented by the instructions of the CPU 501 illustrated in FIG. 5 and by the network I/F 509 illustrated in FIG. 5, transmits or receives various types of data (or information) to or from another terminal, device, or system via the communication network 100.

The storing and reading processor 69, which is implemented by the instructions of the CPU 501 illustrated in FIG. 5 and the HDD 505 illustrated in FIG. 5, performs processing to store various types of data in the memory 6000 or read various types of data stored in the memory 6000.

<Functional Configuration of Mail Server>

The mail server 7 includes a transmitter and receiver 71, and a storing and reading processor 79. These units are functions that are implemented by or that are caused to function by operating any of the elements illustrated in FIG. 5 in cooperation with the instructions of the CPU 501 according to the destination management program expanded from the HD 504 to the RAM 503. The mail server 7 further includes a memory 7000, which is implemented by the HD 504 illustrated in FIG. 5.

(Each Functional Unit of Mail Server)

Next, each functional unit of the mail server 7 is described in detail according to the embodiment. In the following description of the functional configuration of the mail server 7, relationships of the hardware elements in FIG. 5 with each functional unit of the mail server 7 in FIG. 11A will also be described.

The transmitter and receiver 71 of the mail server 7 illustrated in FIG. 11A, which is implemented by the instructions of the CPU 501 illustrated in FIG. 5 and by the network I/F 509 illustrated in FIG. 5, transmits or receives various types of data (or information) to or from another terminal, device, or system via the communication network 100.

The storing and reading processor 79, which is implemented by the instructions of the CPU 501 illustrated in FIG. 5 and the HDD 505 illustrated in FIG. 5, performs processing to store various types of data in the memory 7000 or read various types of data stored in the memory 7000.

<Functional Configuration of Print Server>

The print server 8 includes a transmitter and receiver 81, and a storing and reading processor 89. These units are functions that are implemented by or that are caused to function by operating any of the elements illustrated in FIG. 5 in cooperation with the instructions of the CPU 501 according to the print management program expanded from the HD 504 to the RAM 503. The print server 8 further includes a memory 8000, which is implemented by the HD 504 illustrated in FIG. 5. The memory 8000 stores data relating to an image (in this example, print data) transmitted from the electronic whiteboard 2, etc.

(Print Data Management Table)

FIG. 12C is a conceptual diagram illustrating a print data management table according to the embodiment. The memory 8000 stores a print data management DB 8001, which is implemented by the print data management table illustrated in FIG. 12C. The print data management table illustrated in FIG. 12C stores a user name for identifying a user who owns the privately-owned terminal, a file name of data to be printed such as the data relating to an image (in this example, print data), and print setting parameters, in association with one another.

(Each Functional Unit of Print Server)

Next, each functional unit of the print server 8 is described in detail according to the embodiment. In the following description of the functional configuration of the print server 8, relationships of the hardware elements in FIG. 5 with each functional unit of the print server 8 in FIG. 11A will also be described.

The transmitter and receiver 81 of the print server 8 illustrated in FIG. 11A, which is implemented by the instructions of the CPU 501 illustrated in FIG. 5 and by the network I/F 509 illustrated in FIG. 5, transmits or receives various types of data (or information) to or from another terminal, device, or system via the communication network 100.

The storing and reading processor 89, which is implemented by the instructions of the CPU 501 illustrated in FIG. 5 and the HDD 505 illustrated in FIG. 5, performs processing to store various types of data in the memory 8000 or read various types of data stored in the memory 8000.

<Functional Configuration of MFP>

As illustrated in FIG. 11B, the MFP 9 includes a transmitter and receiver 91, an acceptance unit 92, a print unit 93, a display control 94, a determination unit 95, an obtainer and provider 98, and a storing and reading processor 99. These units are functions that are implemented by or that are caused to function by operating any of the elements illustrated in FIG. 6 in cooperation with the instructions of the CPU 901 according to the print control program expanded to the RAM 902b. The MFP 9 further includes a memory 9000, which is implemented by the HD 909 illustrated in FIG. 6.

(Each Functional Unit of MFP)

Next, each functional unit of the MFP 9 is described in detail according to the embodiment. In the following description of the functional configuration of the MFP 9, relationships of one or more hardware elements in FIG. 6 with each functional unit of the MFP 9 in FIG. 11B will also be described.

The transmitter and receiver 91 of the MFP 9 illustrated in FIG. 11B, which is implemented by the instructions of the CPU 901 illustrated in FIG. 6 and by the network I/F 950 illustrated in FIG. 6, transmits or receives various types of data (or information) to or from another terminal, device, or system via the communication network 100.

The acceptance unit 92, which is implemented by the instructions of the CPU 901 and the control panel 940 illustrated in FIG. 6, accepts various inputs from the user.

The print unit 93, which is implemented by the instructions of the CPU 901 and the printer controller 932 illustrated in FIG. 6, prints an image based on the data relating to an image (print data).

The display control 94, which is implemented by the instructions of the CPU 901 and the control panel 940 illustrated in FIG. 6, displays print setting parameters to be set when performing a copying process, such as color printing or monochrome printing, for example.

The determination unit 95, which is implemented by the instructions of the CPU 901 illustrated in FIG. 6, determines, for example, whether an authentication result transmitted from the terminal management server 5 indicates that the IC card 3 (terminal ID) is a legitimate IC card (terminal ID).

The obtainer and provider 98, which is implemented by the instructions of the CPU 901 and the near-distance communication circuit 920 with the antenna 920a, illustrated in FIG. 6, communicates with the IC card 3 or the smartphone 4 to obtain or provide data from or to the IC card 3 or the smartphone 4 by near-distance communication.

The storing and reading processor 99, which is implemented by the instructions of the CPU 901 and the HDD 908 illustrated in FIG. 6, performs processing to store various types of data in the memory 9000 or read various types of data stored in the memory 9000.

<Functional Configuration of PC>

As illustrated in FIG. 11B, the PC 10 includes a transmitter and receiver 11, an acceptance unit 12, a display control 14, and a storing and reading processor 19. These units are functions that are implemented by or that are caused to function by operating any of the elements illustrated in FIG. 5 in cooperation with the instructions of the CPU 501 according to the terminal control program expanded from the HD 504 to the RAM 503. The PC 10 further includes a memory 1000, which is implemented by the HD 504 illustrated in FIG. 5.

(Each Functional Unit of PC)

Next, each functional unit of the PC 10 is described according to the embodiment. The transmitter and receiver 11 of the PC 10 illustrated in FIG. 11B, which is implemented by the instructions of the CPU 501 illustrated in FIG. 5 and by the network I/F 509 illustrated in FIG. 5, transmits or receives various types of data (or information) to or from another terminal, device, or system via the communication network 100.

The acceptance unit 12, which is implemented by the instructions of the CPU 501, keyboard 511, and mouse 512, illustrated in FIG. 5, accepts various inputs from the user.

The display control 14, which is implemented by the instructions of the CPU 501 illustrated in FIG. 5, controls the display 508 to display such as a drawing image.

The storing and reading processor 19, which is implemented by the instructions of the CPU 501 and the HDD 505 illustrated in FIG. 5, performs processing to store various types of data in the memory 1000 or a storage medium 1100 or to read various types of data stored in the memory 1000 or the storage medium 1100. The storage medium 1100 is implemented by the storage medium 506 illustrated in FIG. 5.

<Operation>

In the following, operations, performed by the communication system 1, are described according to embodiments of the present disclosure. The following describes an example case in which the user A and the user B are having a meeting in a certain meeting room using the electronic whiteboard 2x, as illustrated in FIG. 1. In this example, the user A performs a login process. After an image is drawn by at least one of the user A and the user B, the electronic whiteboard 2x transmits the drawing image data to at least one of the PC 10a owned by the user A and the PC 10b owned by the user B.

<Login Process>

Figure 13:
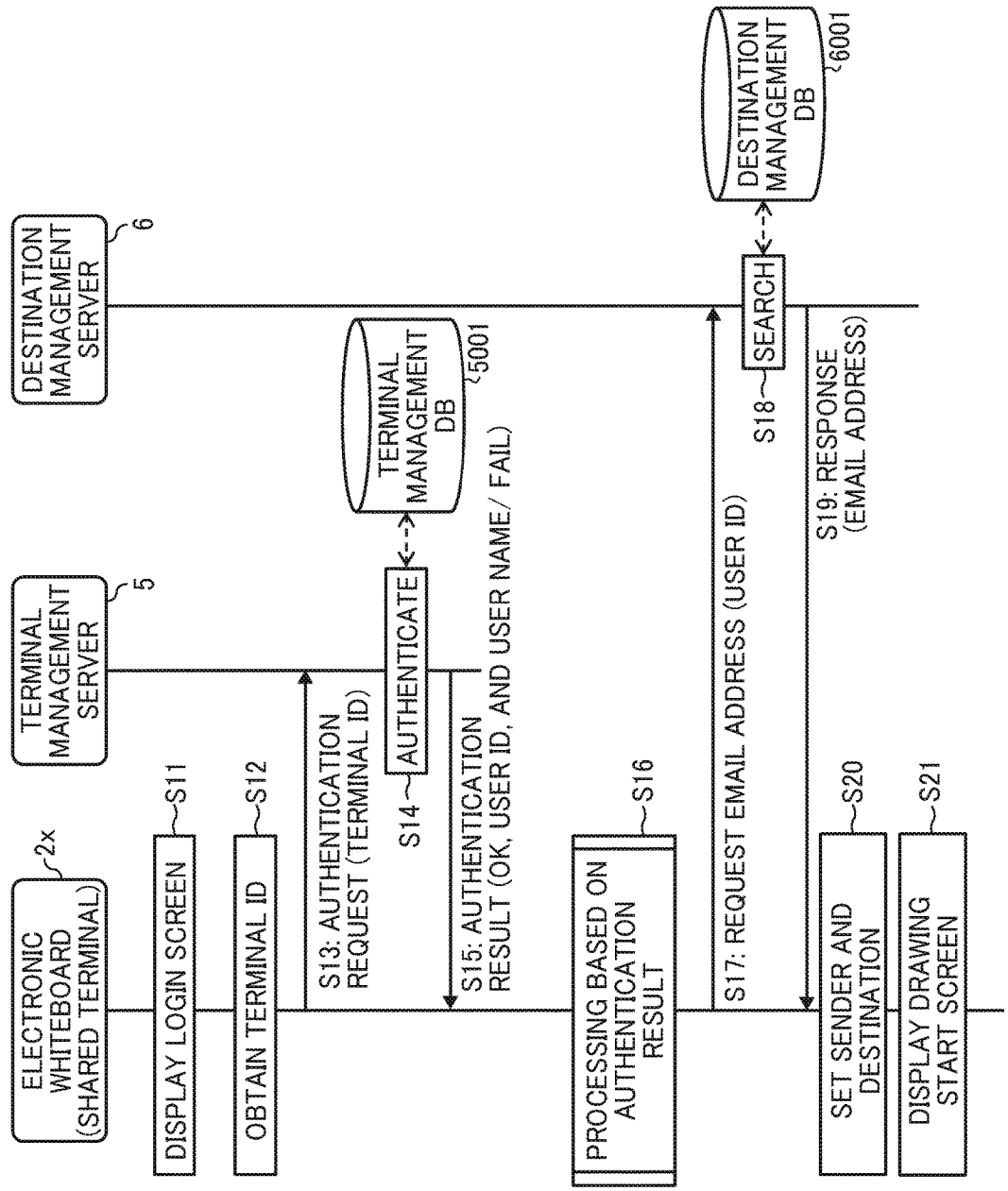
FIG. 13 is a sequence diagram illustrating a login process according to an embodiment of the present disclosure.
Figure 14D:
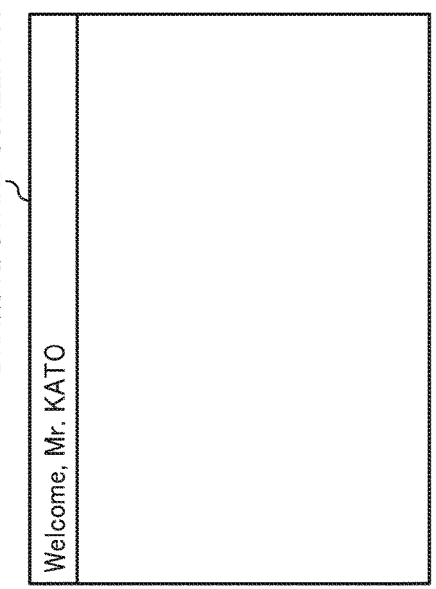
Figure 15:
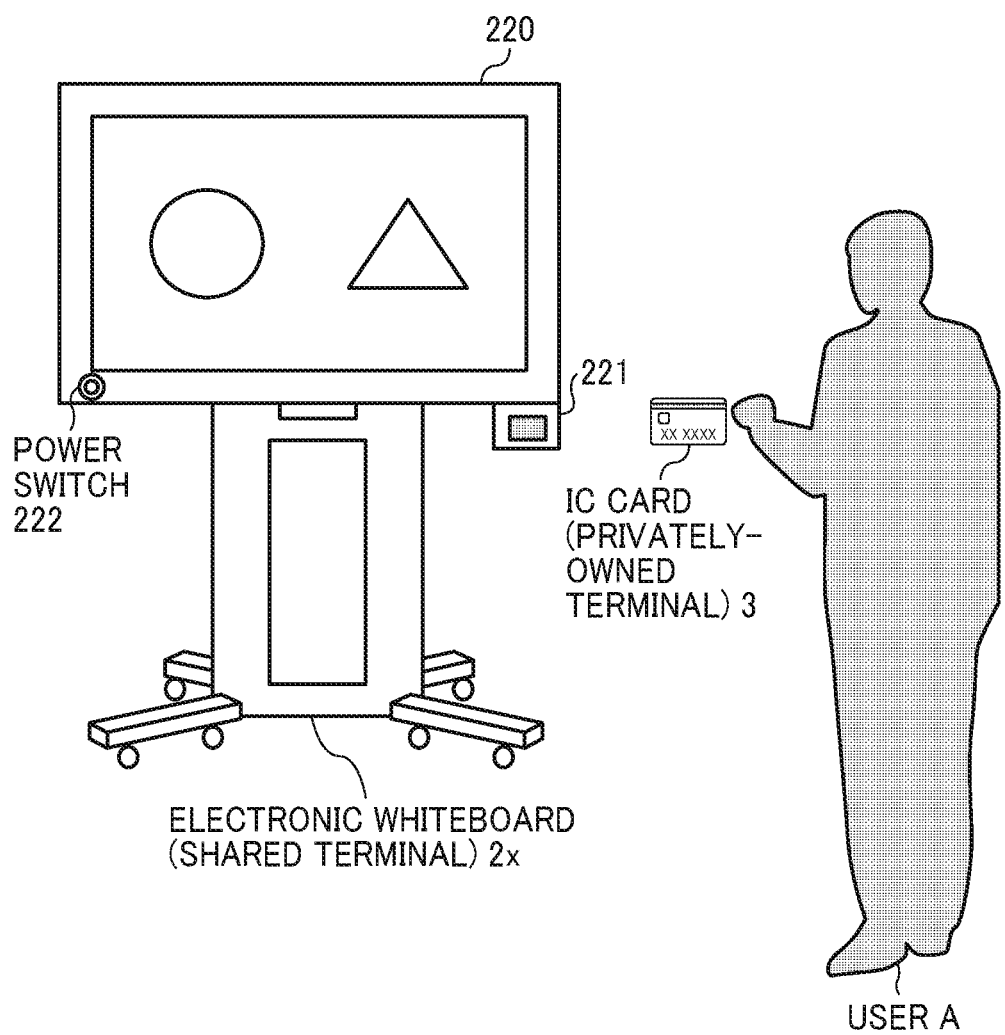
FIG. 15 is an illustration for explaining a use scenario of the electronic whiteboard, according to an embodiment of the present disclosure.

Referring to FIGS. 13 to 16, a description is given of a login process performed by the user A to the electronic whiteboard 2x. FIG. 13 is a sequence diagram illustrating a login process according to the embodiment. FIGS. 14A, 14B, 14C and 14D each illustrates an example screen displayed on the display 220 of the electronic whiteboard 2x. FIG. 15 is an illustration for explaining a use scenario of the electronic whiteboard 2x, according to the embodiment.

As illustrated in FIG. 15, in response to pressing of the power switch 222 of the electronic whiteboard 2x by the user, the display control 24 controls the display 220 to display a login screen 170 as illustrated in FIG. 14A (S11). Next, as illustrated in FIG. 15, when the user A brings his or her IC card 3 into proximity of a near-distance communication device 221 of the electronic whiteboard 2x (or the user A holds the IC card 3 over the near-distance communication device 221), the obtainer and provider 28 of the electronic whiteboard 2x obtains the terminal ID of the IC card from the obtainer and provider 38 of the IC card 3 (S12). The near-distance communication device 221 corresponds to the near-distance communication circuit 219 and the antenna 219a. The transmitter and receiver 21 of the electronic whiteboard 2x transmits a request for login authentication to the terminal management server 5 (S13). This request for login authentication includes the terminal ID obtained at S12. The terminal management server 5 receives the request for login authentication at the transmitter and receiver 51.

Next, the authenticator 52 of the terminal management server 5 performs login authentication of the IC card 3 using the terminal ID that is obtained (S14). More specifically, the storing and reading processor 59 searches the terminal management table (FIG. 12A) using the terminal ID received at S13 as a search key, to obtain the user ID associated with the terminal ID. When the user ID associated with the terminal ID is found, the authenticator 52 confirms the terminal ID of the IC card 3 to determine that the IC card 3 (terminal ID) is a legitimate IC card owned by the authorized user identified with the user ID that is found. When the user ID associated with the terminal ID is not found, the authenticator 52 determines that the IC card 3 (terminal ID) is not a legitimate IC card owned by the authorized user.

Next, the transmitter and receiver 51 of the terminal management server 5 transmits an authentication result to the electronic whiteboard 2x (S15). When the authenticator 52 determines that the IC card 3 is a legitimate IC card, the authentication result includes information indicating that the IC card 3 is a legitimate IC card, the user ID identifying the user who owns the IC card 3, and the user name. When the authenticator 52 determines that the IC card 3 is not a legitimate IC card, the authentication result includes information indicating that the IC card 3 is not a legitimate IC card. The electronic whiteboard 2x receives the authentication result at the transmitter and receiver 21.

Figure 16:
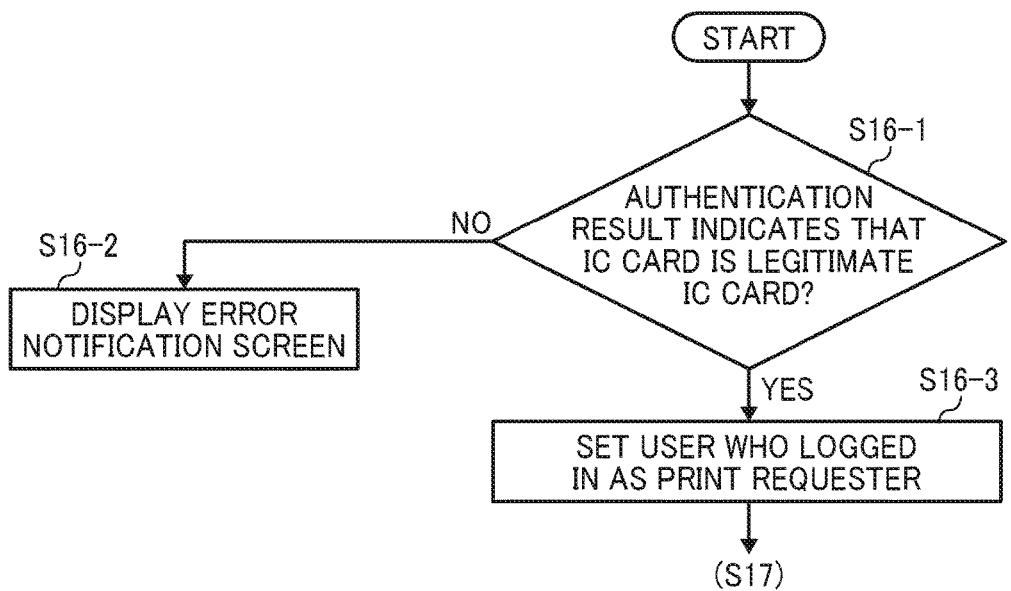
FIG. 16 is a flowchart illustrating a process according to an authentication result when logging in, according to an embodiment of the present disclosure.

Next, the electronic whiteboard 2x performs an operation based on the authentication result (S16). Referring to FIG. 16, a description is given of S16 of the operation performed based on the authentication result. FIG. 16 is a flowchart illustrating an operation performed according to the authentication result when logging in.

As illustrated in FIG. 16, the determination unit 25 determines whether information included in the authentication result received at S15 indicates that the IC card 3 is a legitimate IC card (S16-1). In other words, the determination unit 25 determines whether the terminal ID transmitted at S13 is a legitimate terminal ID. When the determination unit 25 determines that the information included in the authentication result indicates that the IC card 3 is not a legitimate IC card, i.e., that login is failed (S16-1: NO), the display control 24 controls the display 220 to display an error notification screen 180 as illustrated in FIG. 14B (S16-2). When the determination unit 25 determines that the information included in the authentication result indicates that the IC card 3 is a legitimate IC card, i.e., that login is successful (S16-1: YES), the setting unit 27 sets the user A (the user, in this example) who successfully logs in the electronic whiteboard 2x as a print requester (S16-3). The operation then proceeds to S17. The following describes a case in which the authentication result includes the information indicating that the IC card 3 is a legitimate IC card.

The transmitter and receiver 21 of the electronic whiteboard 2x transmits a request for an email address to the destination management server 6 (S17). The email address request includes the user ID that is received at S15. The destination management server 6 receives the email address request at the transmitter and receiver 61.

Next, the storing and reading processor 69 of the destination management server 6 searches the destination management table (FIG. 12B), using the user ID received at S17 as a search key, to obtain the email address associated with the user ID (S18). The transmitter and receiver 61 transmits a response to the email address request to the electronic whiteboard 2x (S19). This response includes an email address that is obtained at S18. The electronic whiteboard 2x receives the response to the email address request at the transmitter and receiver 21.

Next, the setting unit 27 of the electronic whiteboard 2x sets an email sender and an email destination (S20). Specifically, the display control 24 displays the email configuration screen 280 illustrated in FIG. 10B, in which an email address in the sender email address field 283 is switched from the email address assigned to the electronic whiteboard 2x to the email address of the user who logs in the electronic whiteboard 2x. Further, the display control 24 displays the email configuration screen 280 as illustrated in FIG. 10B, in which the email address of the user who logs in the electronic whiteboard 2x is displayed in the address configuration field 274. In other words, both the sender and the destination of the email are the email address of the user A. In the address configuration field 274, before switching the destination email address to the email address of the user who logs in the electronic whiteboard 2x, the display control 24 may display a selection screen that allows a user to select whether to switch the destination email address to the email address of the user who logs in the electronic whiteboard 2x or keep the destination email address unchanged from the email address of the electronic whiteboard 2x.

Further, the display control 24 controls the display 220 to display a drawing start screen 190 that includes a ticker such as "Welcome, Mr. Kato", indicating that the user is able to start drawing, as illustrated in FIG. 14C. This text "Kato" is generated using the user name that is received at S15. Thus, the user A and the user B are able to start drawing on the electronic whiteboard 2x.

<Email Transmission>

Figure 17:
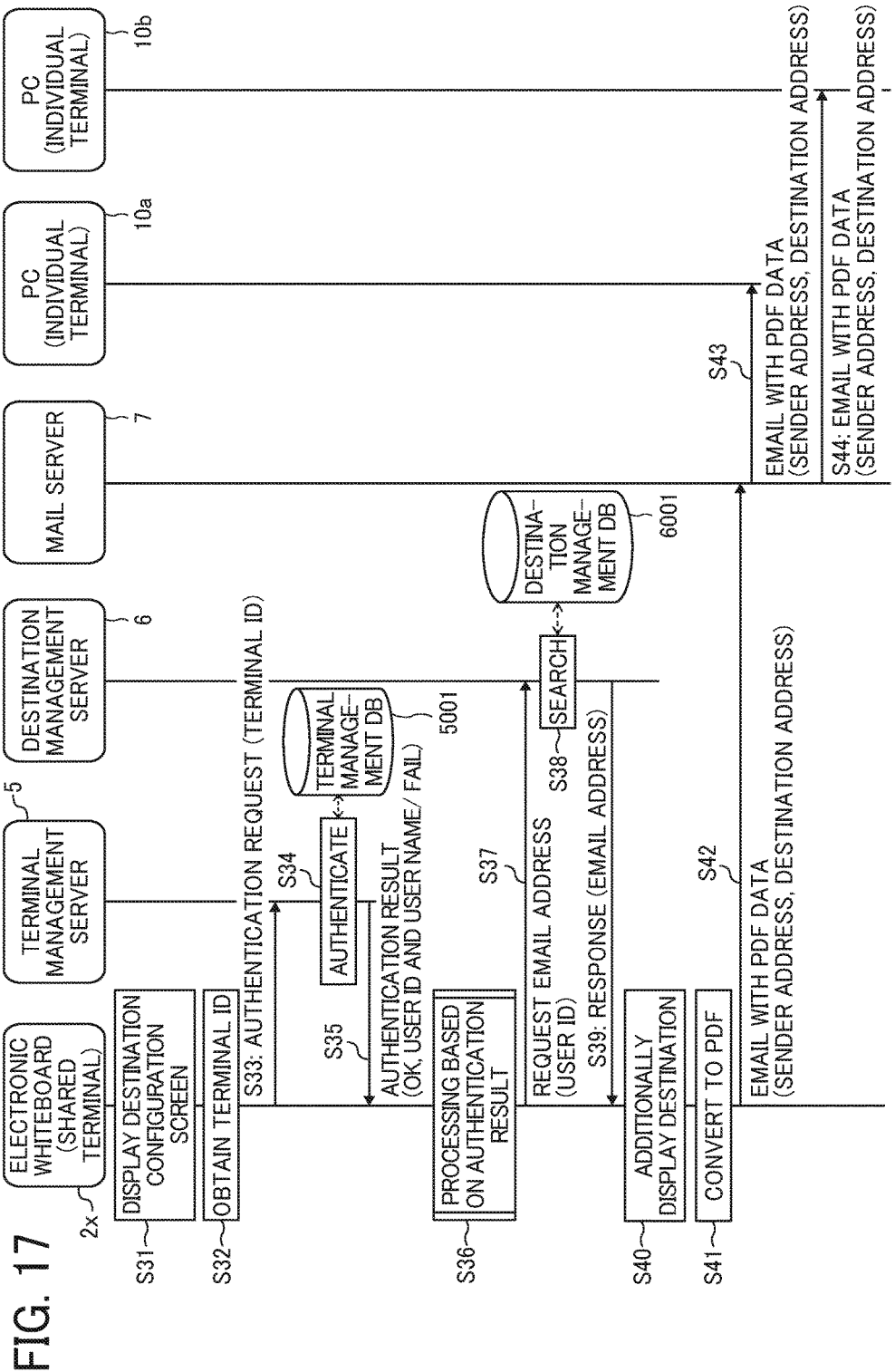
FIG. 17 is a sequence diagram illustrating an operation of transmitting drawing image data attached to an email, according to an embodiment of the present disclosure.
Figure 18:
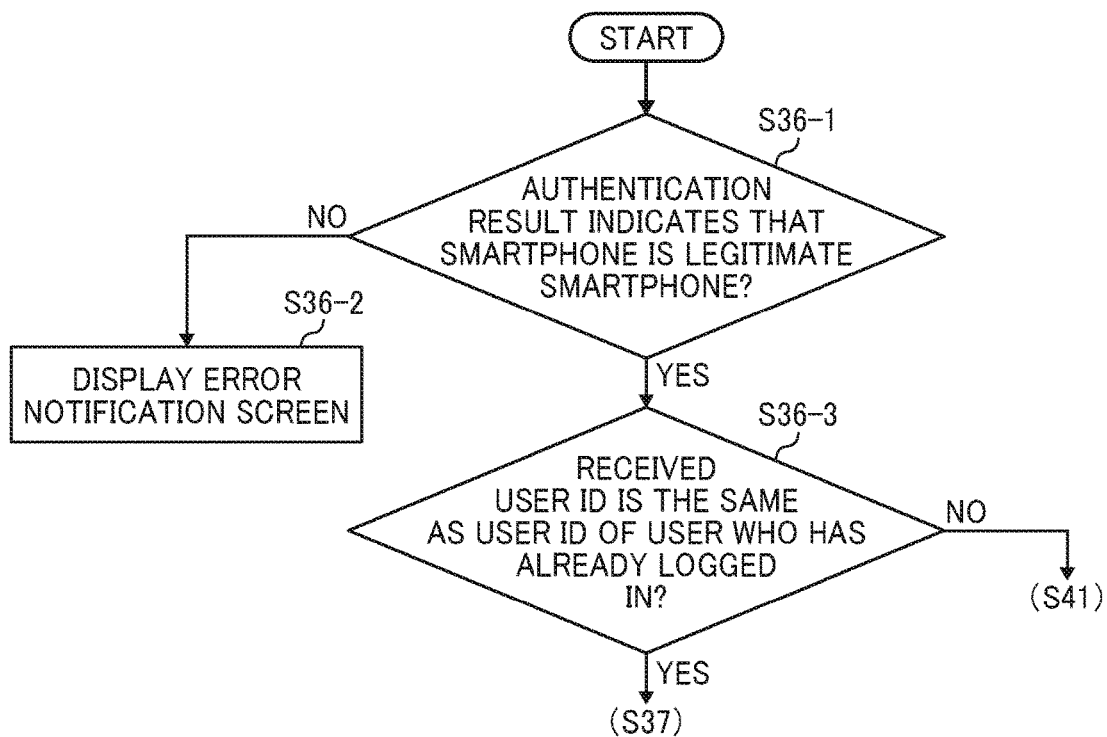
FIG. 18 is a flowchart illustrating an operation performed according to the authentication result when transmitting drawing image data attached to an email, according to an embodiment of the present disclosure.

Referring to FIGS. 17 and 18, a description is given of operation of transmitting an email attached with data attached with the drawing image data from the electronic whiteboard 2x to the PC 10a owned by the user A and the PC 10b owned by the user B. FIG. 17 is a sequence diagram illustrating an operation of transmitting the drawing image data attached to an email. FIG. 18 is a flowchart illustrating an operation performed according to the authentication result when transmitting the drawing image data attached to an email.

After the user A and the user B conduct a meeting, using a drawing image drawn on the electronic whiteboard 2x with the electronic pen 2500, when the user A presses the "Menu" button 231 illustrated in FIG. 8B with such as the electronic pen 2500, and subsequently presses the "Email" button 237, a display control 24 controls the display 220 to display the destination configuration screen 270 as illustrated in FIG. 10A (S31). On the destination configuration screen 270 that is displayed as above, as illustrated in FIG. 10A, the email address of the user A, who logs in the electronic whiteboard 2x, is displayed at first in the address configuration field 274. Alternatively, the user A may select the "Manual input" tab 272 to manually enter the email address of the user A with such as the electronic pen 2500.

When the user B, who does not log in the electronic whiteboard 2x, wants to add his or her own email address in the email destination, the user B brings his or her smartphone 4 into proximity of the near-distance communication device 221. In response to the smartphone 4 being brought into proximity of the near-distance communication device 221, the obtainer and provider 28 of the electronic whiteboard 2x obtains the terminal ID for identifying the smartphone 4 (as an example of the privately-owned terminal), from the obtainer and provider 48 of the smartphone 4 (S32). In this case, even when the user B who does not log in the electronic whiteboard 2x brings his or her smartphone 4 into proximity of the near-distance communication device 221, the email address in the sender email address field 283 illustrated in FIG. 10B is kept unchanged from the email address of the user A who logs in the electronic whiteboard 2x.

Next, the transmitter and receiver 21 of the electronic whiteboard 2x transmits an authentication request for authenticating the smartphone 4 to the terminal management server 5 (S33). This authentication request includes the terminal ID of the smartphone 4, obtained at the obtainer and provider 28. The terminal management server 5 receives the authentication request at the transmitter and receiver 51.

The authenticator 52 of the terminal management server 5 authenticates the smartphone 4 using the terminal ID that is obtained (S34). More specifically, the storing and reading processor 59 searches the terminal management table (FIG. 12A) using the terminal ID received at S33 as a search key, to obtain the user ID associated with the terminal ID. When the user ID associated with the terminal ID is found, the authenticator 52 confirms the terminal ID of the smartphone 4 to determine that the smartphone 4 (terminal ID) is a legitimate smartphone owned by the authorized user identified with the user ID that is found. When the user ID associated with the terminal ID is not found, the authenticator 52 determines that the smartphone 4 (terminal ID) is not a legitimate smartphone owned by the authorized user.

Next, the transmitter and receiver 51 of the terminal management server 5 transmits an authentication result to the electronic whiteboard 2x (S35). When the authenticator 52 determines that the smartphone 4 is a legitimate smartphone, the authentication result includes information indicating that the smartphone 4 is a legitimate smartphone, the user ID identifying the user who owns the smartphone, and the user name. When the authenticator 52 determines that the smartphone 4 is not a legitimate smartphone, the authentication result includes information indicating that the smartphone 4 is not a legitimate smartphone. The electronic whiteboard 2x receives the authentication result at the transmitter and receiver 21.

Next, the electronic whiteboard 2x performs processing based on the authentication result (S36). Referring to FIG. 18, a description is given of S36 of the operation performed based on the authentication result. FIG. 18 is a flowchart illustrating an operation performed according to the authentication result when transmitting drawing image data attached to an email.

As illustrated in FIG. 18, the determination unit 25 determines whether information included in the authentication result received at S35 indicates that the smartphone 4 is a legitimate smartphone (S36-1). In other words, the determination unit 25 determines whether the terminal ID transmitted at S33 is a legitimate terminal ID. When the determination unit 25 determines that the information included in the authentication result indicates that the smartphone 4 is not a legitimate smartphone (S36-1: NO), the display control 24 controls the display 220 to display the error notification screen 180 as illustrated in FIG. 14B (S36-2). By contrast, when the determination unit 25 determines that the information included in the authentication result indicates that the smartphone 4 is a legitimate smartphone (S36-1: YES), the determination unit 25 further determines whether the user ID received at S35 is the same as the user ID of the user A, who logs in the electronic whiteboard 2x (S36-3). When the determination unit 25 determines that the user ID received at S35 is the same as the user ID of the user who logs in the electronic whiteboard 2x (S36-3: YES), the operation proceeds to S41 of FIG. 17 to be described later. By contrast, when the determination unit 25 determines that the user ID received at S35 is not the same as the user ID of the user who logs in the electronic whiteboard 2x (S36-3: NO), the transmitter and receiver 21 of the electronic whiteboard 2x transmits a request for email address to the destination management server 6 (S37). This email address request includes the user ID that is received at S35. In this case, the user ID of the user B is included in the email address request. The destination management server 6 receives the email address request at the transmitter and receiver 61.

Next, the storing and reading processor 69 of the destination management server 6 searches the destination management table (FIG. 12B), using the user ID received at S37 as a search key, to obtain the email address associated with the user ID (S38). The transmitter and receiver 61 transmits a response to the email address request to the electronic whiteboard 2x (S39). This response includes the email address that is obtained at S38. The electronic whiteboard 2x receives the response to the email address request at the transmitter and receiver 21.

Next, the display control 24 of the electronic whiteboard 2x controls the display 220 to additionally display, with the email address (USER1@ . . . ) of the user A that has been already displayed in the address configuration field 274, an email address (USER2@ . . . ) of the user B, as illustrated in FIG. 14D (S40).

Subsequently, when the acceptance unit 22 of the electronic whiteboard 2x accepts pressing of the "Send" button 277 by the user A or the user B, the first generator 26a of the electronic whiteboard 2x generates image data in PDF, from the drawing image data in bitmap that has been generated based on drawing by the user (S41). The transmitter and receiver 21 transmits an email attached with the image data generated at S41, to the mail server 7 (S42). The mail server 7 receives the email attached with the image data in PDF at the transmitter and receiver 71. This email includes a sender email address, which is the email address of the user A who logs in the electronic whiteboard 2x, and a destination email address, which is also the email address of the user A who logs in the electronic whiteboard 2x. Further, in a case in which the user B brings his or her smartphone 4 into proximity to the near-distance communication device 221, the destination email address includes, in addition to the email address of the user A, the email address of the user B who does not logs in the electronic whiteboard 2x. In other words, because the sender email address is changed from the email address of the electronic whiteboard 2x to the email address of the user A at S20, the user A sends an email to his or her own address. Further, the user B receives an email that is addressed to the user B him- or herself from the user A. Hereinafter, a description is given of the case in which the sender email address includes the email address of user B in addition to the email address of the user A.

The transmitter and receiver 71 of the mail server 7 transmits the email, attached with the image data in PDF, to each one of the PC 10a and the PC 10b (S43, S44). The email includes a sender email address of the user A, and a destination email address that is, an address of each of the PC 10a and the PC 10b that is received at S39. Thus, each of the PC 10a and PC 10b receives the email attached with the image data in PDF, which is generated based on the drawing image drawn on the electronic whiteboard 2x.

<Print of Drawing Image Data>

Figure 19:
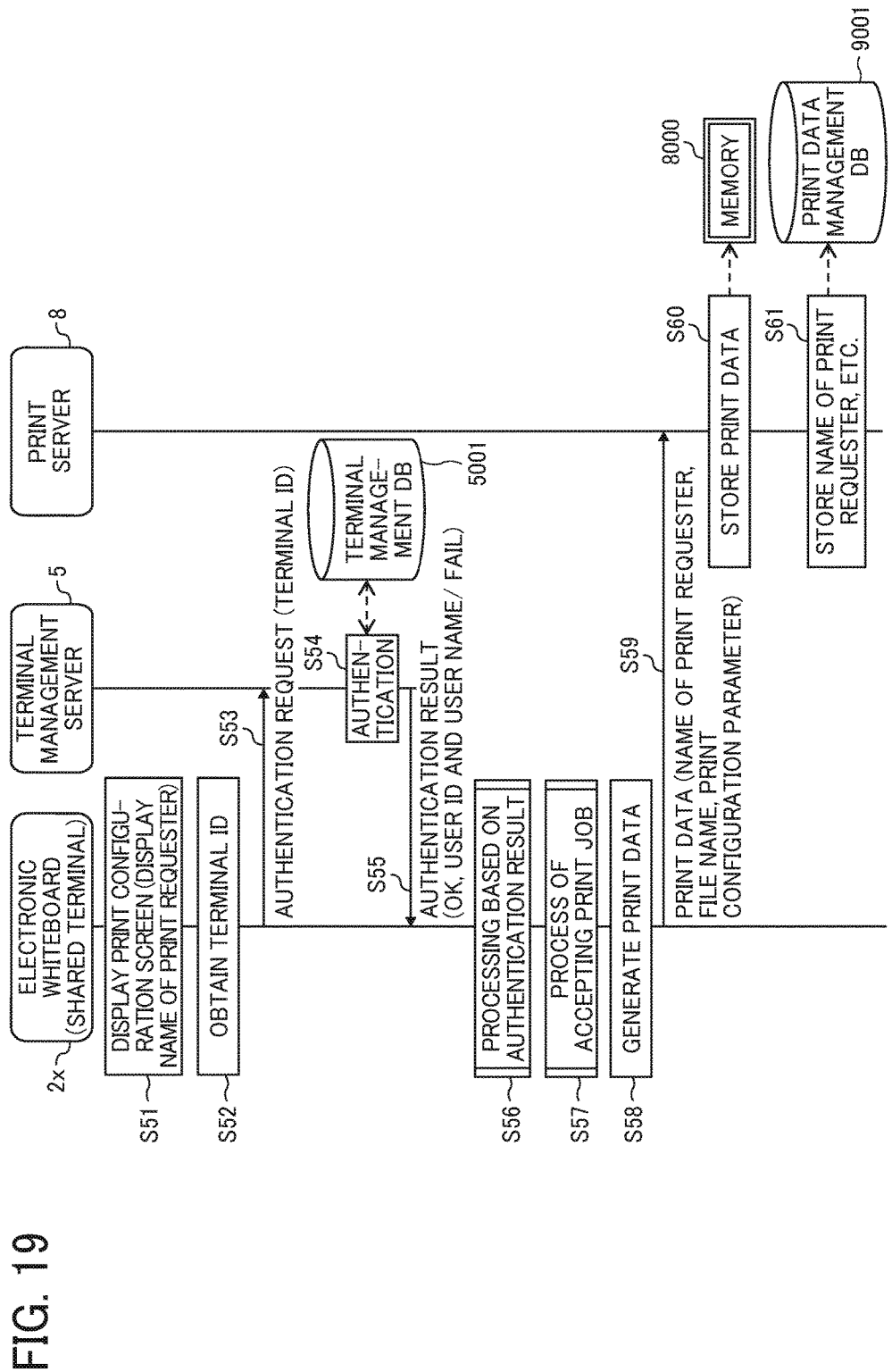
FIG. 19 is a sequence diagram illustrating an operation for preparing print of drawing image data, according to an embodiment of the present disclosure.
Figure 20:
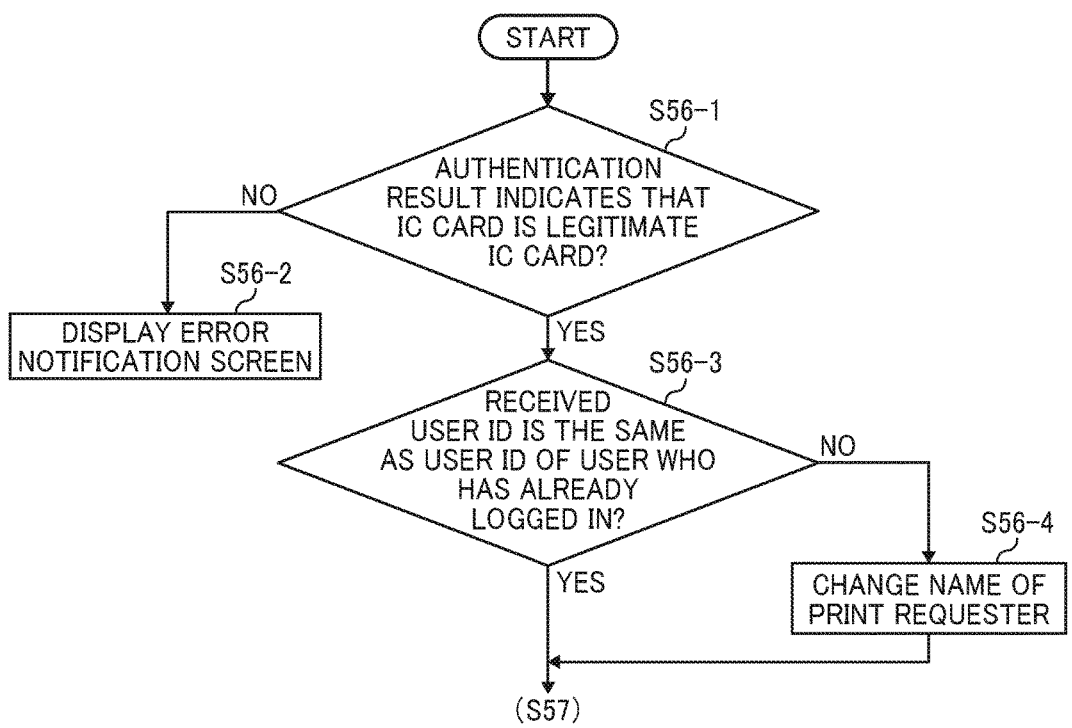
FIG. 20 is a flowchart illustrating an operation performed according to the authentication result when printing is to be performed, according to an embodiment of the present disclosure.
Figure 21:
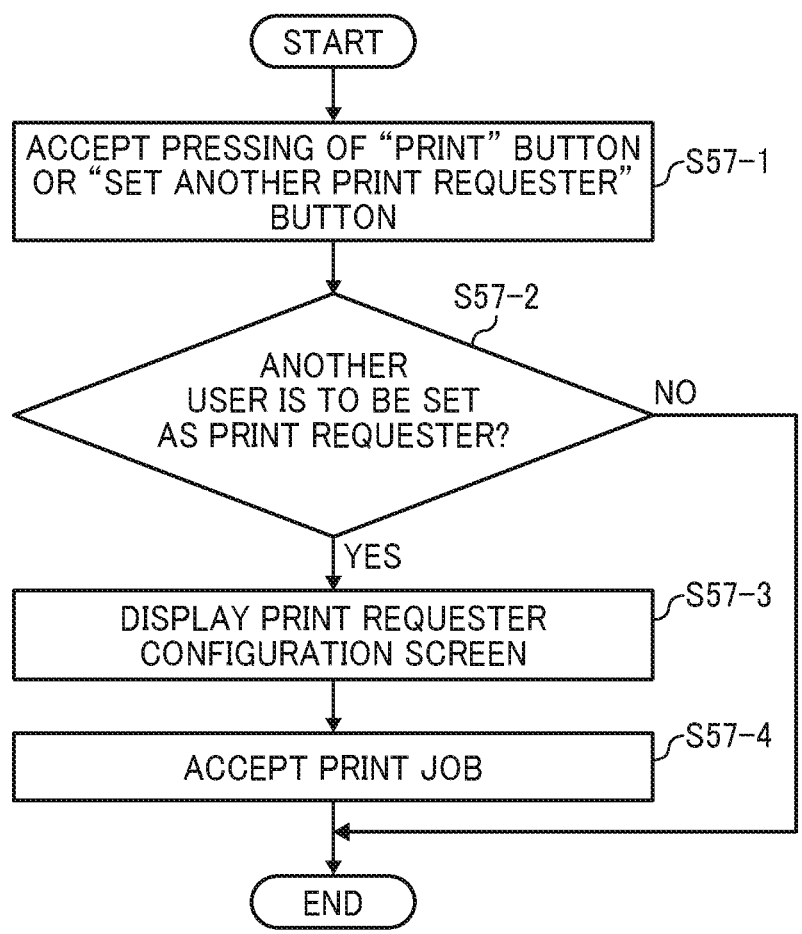
FIG. 21 is a flowchart illustrating an operation of accepting a print job, according to an embodiment of the present disclosure.
Figure 22:
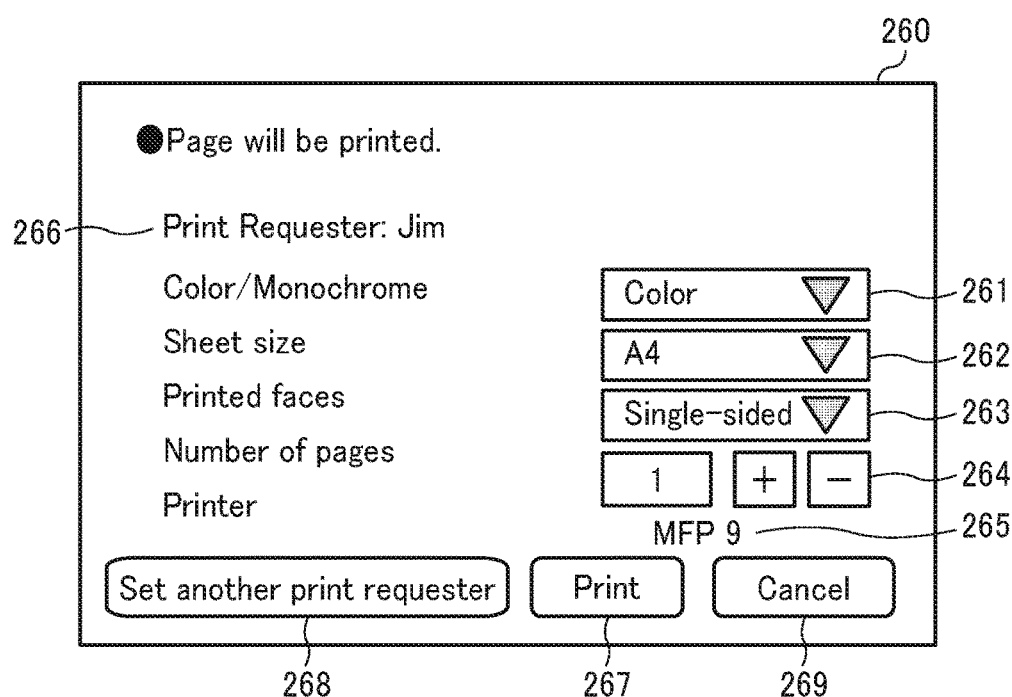
FIG. 22 illustrates an example of a print configuration screen, according to an embodiment of the present disclosure.

Hereinafter, a description is given of a case in which the drawing image data that is generated based on a drawing image drawn on the electronic whiteboard 2x by the user A and the user B is transmitted from the electronic whiteboard 2x to the MFP 9 via the print server 8, and printing is performed based on the drawing image data, with reference to FIGS. 19 to 24. FIG. 19 is a sequence diagram illustrating an operation for preparing print of drawing image data. FIG. 20 is a flowchart illustrating an operation performed according to the authentication result when printing is to be performed. FIG. 22 illustrates an example of the print configuration screen 260.

After the user A and the user B conduct a meeting, using a drawing image drawn on the electronic whiteboard 2x with the electronic pen 2500, when the user A presses the "Menu" button 231 illustrated in FIG. 8B with such as the electronic pen 2500, and subsequently presses the "Print" button 236, the display control 24 controls the display 220 to display the print configuration screen 260 as illustrated in FIG. 9D (S51). The setting unit 27 sets the user name of the user A who logs in the electronic whiteboard 2x as a print requester name. The display control 24 controls the display 220 to display the user name of the user A who logs in the electronic whiteboard 2x as a print requester name on the print configuration screen 260.

Next, as illustrated in FIG. 15, when the user A brings his or her IC card 3 into proximity of the near-distance communication device 221 of the electronic whiteboard 2x, the obtainer and provider 28 of the electronic whiteboard 2x obtains the terminal ID identifying the IC card 3 (as an example of the privately-owned terminal) from the obtainer and provider 38 of the IC card 3 (S52). Then, the transmitter and receiver 21 of the electronic whiteboard 2x transmits an authentication request for authenticating the IC card 3 to the terminal management server 5 (S53). This authentication request includes the terminal ID of the IC card 3, obtained at the obtainer and provider 28. The terminal management server 5 receives the authentication request at the transmitter and receiver 51.

The authenticator 52 of the terminal management server 5 authenticates the IC card 3 using the terminal ID that is obtained (S54). More specifically, the storing and reading processor 59 searches the terminal management table (FIG. 12A) using the terminal ID received at S53 as a search key, to obtain the user name associated with the terminal ID. When the user name associated with the terminal ID is found, the authenticator 52 confirms the terminal ID of the IC card 3 to determine that the IC card 3 (terminal ID) is a legitimate IC card owned by the authorized user identified with the user name that is found. When the user name associated with the terminal ID is not found, the authenticator 52 determines that the IC card 3 (terminal ID) is not a legitimate IC card owned by the authorized user.

Next, the transmitter and receiver 51 of the terminal management server 5 transmits an authentication result to the electronic whiteboard 2x (S55). When the authenticator 52 determines that the IC card 3 is a legitimate IC card, the authentication result includes information indicating that the IC card 3 is a legitimate IC card and the user name. When the authenticator 52 determines that the IC card 3 is not a legitimate IC card, the authentication result includes information indicating that the IC card 3 is not a legitimate IC card. The electronic whiteboard 2x receives the authentication result at the transmitter and receiver 21.

Next, the electronic whiteboard 2x performs processing based on the authentication result (S56). Referring to FIG. 20, a description is given of S56 of the operation performed based on the authentication result. FIG. 20 is a flowchart illustrating an operation performed according to the authentication result when printing is to be performed.

As illustrated in FIG. 20, the determination unit 25 determines whether information included in the authentication result received at S55 indicates that the IC card 3 is a legitimate IC card (S56-1). In other words, the determination unit 25 determines whether the terminal ID transmitted at S53 is a legitimate terminal ID. When the determination unit 25 determines that the information included in the authentication result indicates that the IC card 3 is not a legitimate IC card (S56-1: NO), the display control 24 controls the display 220 to display the error notification screen 180 as illustrated in FIG. 14B (S56-2). By contrast, when the determination unit 25 determines that the information included in the authentication result indicates that the IC card 3 is a legitimate IC card (S56-1: YES), the determination unit 25 further determines whether the user ID received at S55 is the same as the user ID of the user A, who logs in the electronic whiteboard 2x (S56-3). When the determination unit 25 determines that the user name received at S55 is the same as the name of the user A, who logs in the electronic whiteboard 2x (S56-3: YES), the operation proceeds to S57 of FIG. 19 to be described later. By contrast, when the determination unit 25 determines that the user name received at S55 is not the same as the name of the user A, who logs in the electronic whiteboard 2x (S53-3: NO), the setting unit 27 changes the print requester name to the user name received at S55 (S56-4). For example, in a case in which the user A, who logs in the electronic whiteboard 2x, brings his or her IC card 3 into proximity of the near-distance communication device 221 when the print configuration screen 260 as illustrated in FIG. 9D is being displayed under control of the display control 24, the print requester name remains unchanged from "Kato". By contrast, in a case in which the user B, who does not log in the electronic whiteboard 2x, brings his or her smartphone 4 into proximity of the near-distance communication device 221 when the print configuration screen 260 as illustrated in FIG. 9D is being displayed under control of the display control 24, the print requester name is changed to "Jim" from "Kato", as illustrated in FIG. 22. After the process of the step S56-4, the operation proceeds to step S57.

Referring again to FIG. 19, the acceptance unit 22 of the electronic whiteboard 2x accepts a print job (S57). Specifically, the acceptance unit 22 accepts the setting of print setting parameters such as color printing or monochrome printing from the user A on the print configuration screen 260 illustrated in FIG. 9D or from the user B on the print configuration screen 260 illustrated in FIG. 22 using the electronic pen 2500. Hereinafter, a description is given of S57 of the operation of accepting a print job, with reference to FIG. 21. FIG. 21 is a flowchart illustrating the operation of accepting a print job.

First, the acceptance unit 22 accepts pressing of the "Print" button 267 or a "Set another print requester" button 268 by the user A on the print configuration screen 260 (FIG. 9D) (S57-1).

Next, the determination unit 25 determines whether the "Set another print requester" button 268 is pressed, to determine whether another user is to be set as a print requester (S57-2). When the "Set another print requester" button 268 is pressed, that is, when the determination unit 25 determines that another user is to be set as a print requester (S57-2: YES), the display control 24 controls the display 220 to display a print requester configuration screen 300 as illustrated in FIG. 10D (S57-3).

The print requester configuration screen 300 displays a print requester field 301 to be entered with a print requester name and a "Print" button 307 to be pressed by the user to start printing. Further, on the print requester configuration screen 300, a "Cancel" button 309 is displayed to return to the print configuration screen 260 illustrated in FIG. 9D. When the user wants to have another user such as a secretary to pick up printed materials output from the MFP 9, the user enters another user name C (for example, Mary) in the print requester field 301 and presses the "Print" button 307. The acceptance unit 22 accepts the another user name that is entered and the pressing of the "Print" button 307 (S57-4). Then, the operation of S57 for accepting the print job ends.

By contrast, when the determination unit 25 determines that the "Print" button 267 is pressed, that is, when the determination unit 25 determines that another user is not to be set as a print requester (S57-2: NO), the operation of S57 for accepting the print job ends. At S57, the pressing of the "Print" button 267 is accepted. In response to pressing of the "Print" button 267 or the "Print" button 307, the second generator 26b generates print data, which is image data in PDL, from drawing image data in bitmap that is generated based on drawing by the user A and the user B (S58).

Next, the transmitter and receiver 21 of the electronic whiteboard 2 transmits the print data generated at S58, to the print server 8 (S59). This print data contains information about the print data (a print requester name, a file name, and print setting parameters). The print server 8 receives the print data at the transmitter and receiver 81. In a case in which the "Print" button 267 is pressed at S57-1, the print requester name included in the information about the print data is a user name (Kato) of the user A. On the other hand, in a case in which another user name (Mary) is entered in the print requester field 301 and the "Print" button 307 is pressed at the S57-4, the print requester name included in the information about the print data is the user name (Kato) of the user A and a user name (Mary) of another user C.

Next, the storing and reading processor 89 of the print server 8 stores the print data received at S59 in the memory 8000 (S60). Further, the storing and reading processor 89 stores, in the print data management table (FIG. 12C), the information about the print data received at S59, such as the print requester name, the file name, and the print setting parameters in association with each other (S61). The fourth record in the print data management table of FIG. 12C indicates a case in which the print requester name included in the information about the print data is the user name (Kato) of the user A and the user name (Mary) of the user C. This enables the user C prints the print data of the user A at the MFP 9 on behalf of the user A in a printing process of S80, which is described later. Thus, the operation for preparing print of drawing image data ends.

Figure 23:
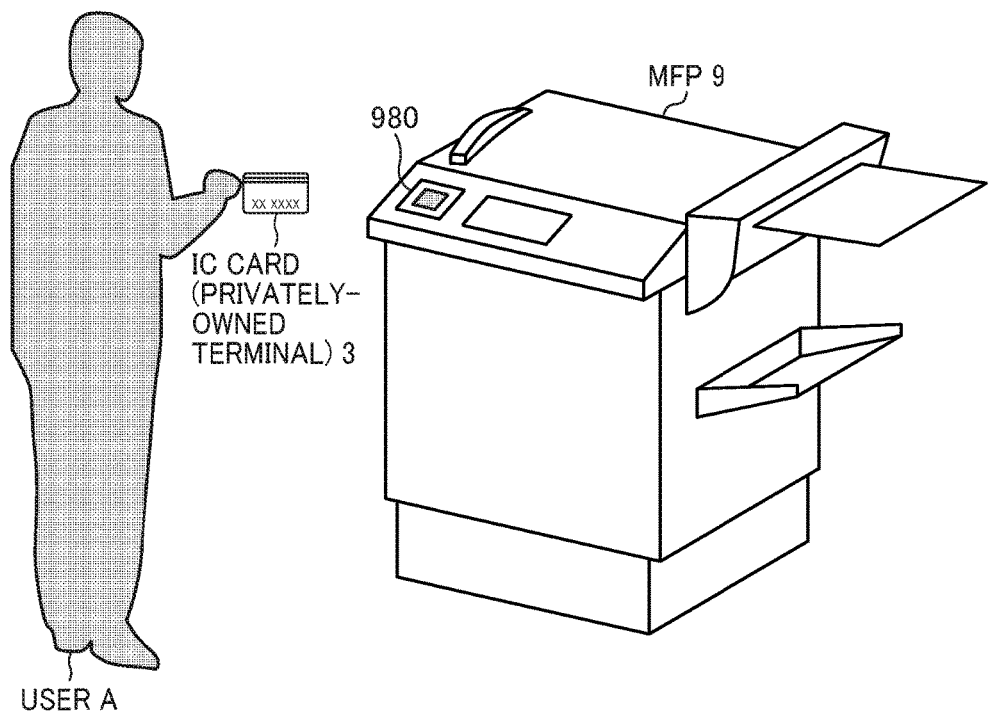
FIG. 23 is an illustration for explaining a use scenario of the MFP, according to the embodiment of the present disclosure.
Figure 24:
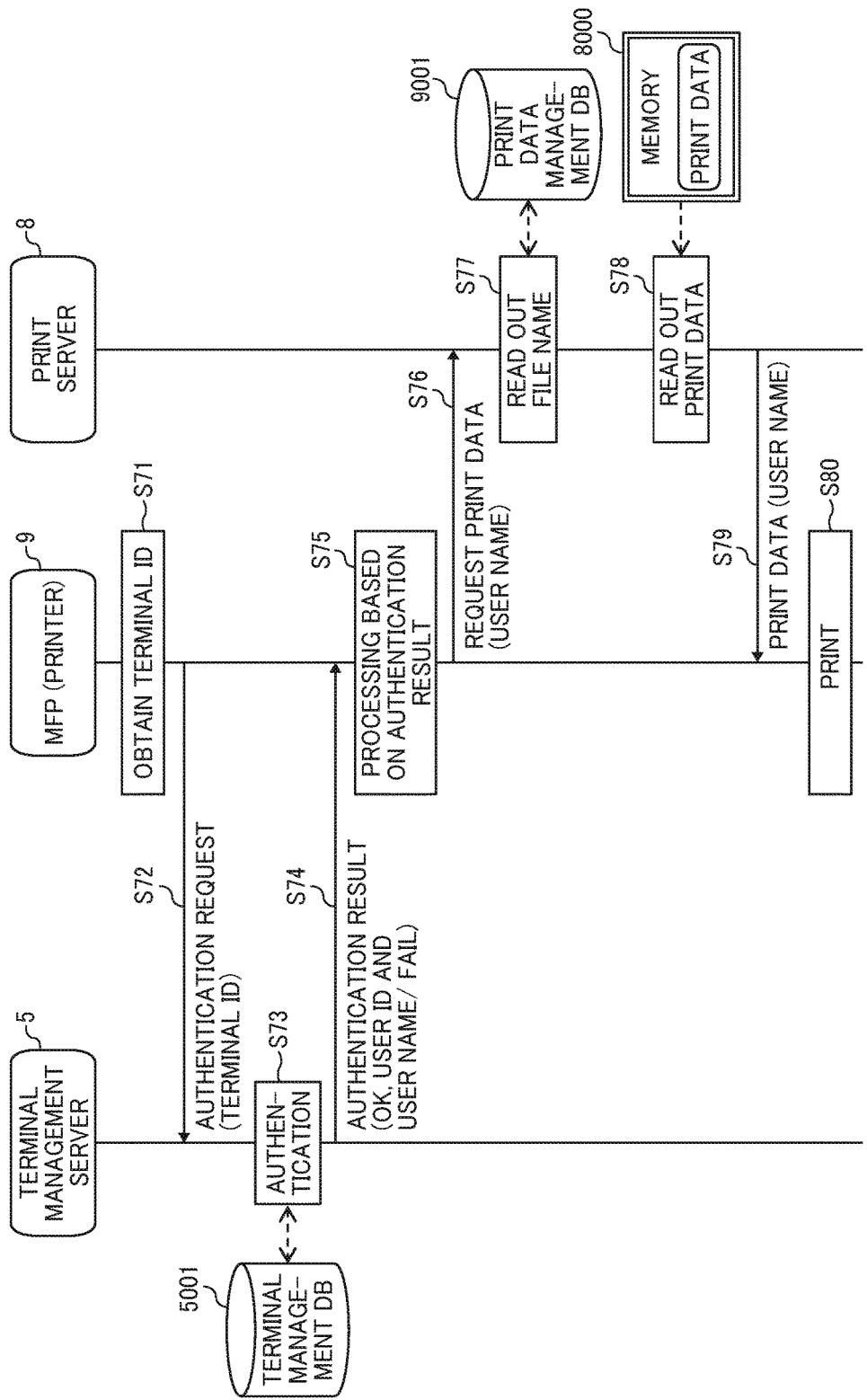
FIG. 24 is a sequence diagram illustrating a printing process according to drawing image data, according to an embodiment of the present disclosure.

Hereinafter, a description is given of a printing process to be performed after the preparation, with reference to FIGS. 23 and 24. FIG. 23 is an illustration for explaining a use scenario of the MFP 9, according to the embodiment. FIG. 24 is a sequence diagram illustrating a printing process according to the drawing image data. In this disclosure, a description is given of an example case in which user A prepares for printing in the print preparation process of S51 to S61. It should be noted that, referring to FIG. 23, a near-distance communication device 980 provided with the MFP 9 is a device that performs processing by the obtainer and provider 98.

First, as illustrated in FIG. 23, when the user A travels to a place where the MFP 9 is located, and brings his or her IC card 3 into proximity of a near-distance communication device 980 of the MFP 9, the obtainer and provider 98 of the MFP 9 obtains the terminal ID of the IC card from the obtainer and provider 38 of the IC card 3, as illustrated in FIG. 24 (S71). Then, the transmitter and receiver 91 of the MFP 9 transmits an authentication request for authenticating the IC card 3 to the terminal management server 5 (S72). This authentication request includes the terminal ID of the IC card 3, obtained at the obtainer and provider 98. The terminal management server 5 receives the authentication request at the transmitter and receiver 51.

The authenticator 52 of the terminal management server 5 authenticates the IC card 3 using the terminal ID that is obtained (S73). More specifically, the storing and reading processor 59 searches the terminal management table (FIG. 12A) using the terminal ID received at S72 as a search key, to obtain the user name associated with the terminal ID. When the user name associated with the terminal ID is found, the authenticator 52 confirms the terminal ID of the IC card 3 to determine that the IC card 3 (terminal ID) is a legitimate IC card owned by the authorized user identified with the user name that is found. When the user name associated with the terminal ID is not found, the authenticator 52 determines that the IC card 3 (terminal ID) is not a legitimate IC card owned by the authorized user.

Next, the transmitter and receiver 51 of the terminal management server 5 transmits an authentication result to the MFP 9 (S74). When the authenticator 52 determines that the IC card 3 is a legitimate IC card, the authentication result includes information indicating that the IC card 3 is a legitimate IC card, the user ID identifying the user who owns the IC card 3, and the user name. When the authenticator 52 determines that the IC card 3 is not a legitimate IC card, the authentication result includes information indicating that the IC card 3 is not a legitimate IC card. The MFP 9 receives the authentication result at the transmitter and receiver 91.

Next, the MFP 9 performs an operation based on the authentication result (S75). Specifically, the determination unit 95 checks a content of the authentication result. When the determination unit 95 determines that the authentication result includes information indicating that the IC card is not a legitimate IC card, no printing process is performed. By contrast, when the determination unit 95 determines that the authentication result includes information indicating that the IC card 3 is a legitimate IC card, the operation proceeds to step S76. The following describes a case in which the authentication result includes information indicating that the IC card 3 is a legitimate IC card.

The transmitter and receiver 91 of the MFP 9 transmits a request for print data to the print server 8 (S76). This request includes the user name that is received at S74. The print server 8 receives the request for print data at the transmitter and receiver 81.

Next, the storing and reading processor 89 of the print server 8 searches the print data management table (FIG. 12C), using the user name received at S74 as a search key, to obtain a file name associated with the user name (S77). Further, the storing and reading processor 89 reads out print data whose file name is the file name obtained at S77 from the memory 9000 (S78). Then, the transmitter and receiver 81 transmits the print data that is read out, to the MFP 9 (S79). This print data includes the user name received at S76. The MFP 9 receives the print data at the transmitter and receiver 91.

Next, the print unit 93 of the MFP 9 prints an image on a printing paper based on the print data and outputs the printing paper on which the image is printed (S80). The user ID may be transmitted and received at the steps S76 and S79, instead of the user name. In this case, at the step S77, the user ID is used as a search key. Then, the printing process ends.

<Termination Process>

Figure 25:
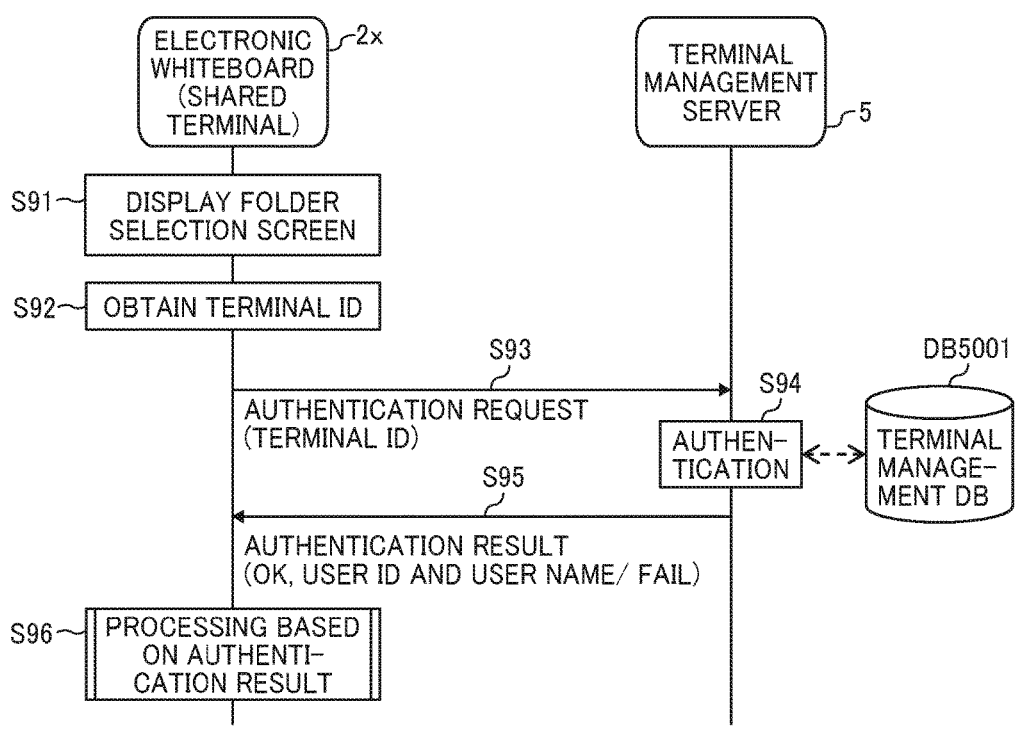
FIG. 25 is a sequence diagram illustrating a process of terminating drawing an image, according to the embodiment of the present disclosure.
Figure 26:
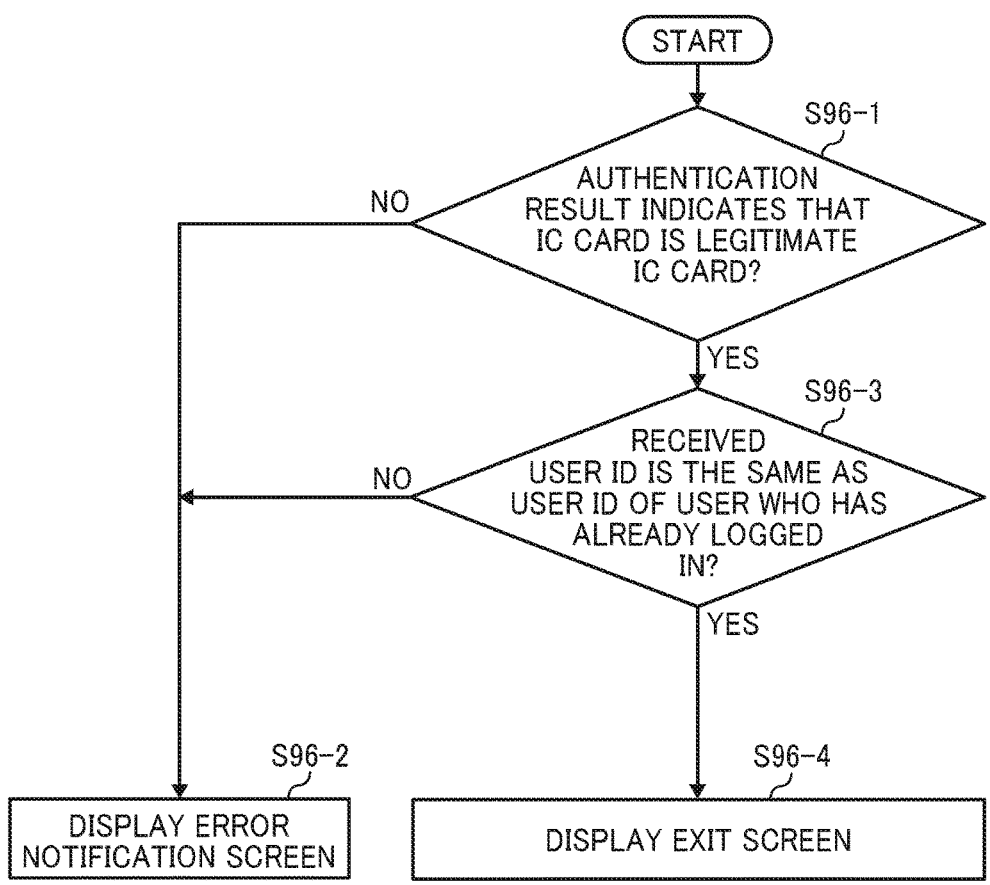
FIG. 26 is a flowchart illustrating a termination process performed when a folder is selected for saving a file, according to an embodiment of the present disclosure.

Hereinafter, with reference to FIG. 25 and FIG. 26, a description is given of termination process as an example of a process other than the email transmission process and the printing process described above. FIG. 25 is a sequence diagram illustrating a process of terminating drawing an image according to the embodiment. FIG. 26 is a flowchart illustrating a termination process performed when a folder is selected for saving a file. In the following, an example case in which the user A brings his or her IC card 3 into proximity of the near-distance communication device 221 of the electronic whiteboard 2x.

After the user A and the user B conduct a meeting, using a drawing image drawn on the electronic whiteboard 2x with the electronic pen 2500, when the user A presses the "Menu" button 231 illustrated in FIG. 8B with such as the electronic pen 2500, and subsequently presses the "Save" button 235, the display control 24 controls the display 220 to display the folder selection screen 250 as illustrated in FIG. 9C (S91).

Next, when the user A brings his or her IC card 3 into proximity of the near-distance communication device 221 of the electronic whiteboard 2x, the obtainer and provider 28 of the electronic whiteboard 2x obtains the terminal ID identifying the IC card 3 (as an example of the privately-owned terminal) from the obtainer and provider 38 of the IC card 3 (S92).

The transmitter and receiver 21 of the electronic whiteboard 2x transmits an authentication request for authenticating the IC card 3 to the terminal management server 5 (S93). This authentication request includes the terminal ID of the IC card 3, obtained at the obtainer and provider 28. The terminal management server 5 receives the authentication request at the transmitter and receiver 51.

The authenticator 52 of the terminal management server 5 authenticates the IC card 3 using the terminal ID that is obtained (S94). More specifically, the storing and reading processor 59 searches the terminal management table (FIG. 12A) using the terminal ID received at S93 as a search key, to obtain the user ID associated with the terminal ID. When the user ID associated with the terminal ID is found, the authenticator 52 confirms the terminal ID of the IC card 3 to determine that the IC card 3 (terminal ID) is a legitimate IC card owned by the authorized user identified with the user ID that is found. When the user ID associated with the terminal ID is not found, the authenticator 52 determines that the IC card 3 (terminal ID) is not a legitimate IC card owned by the authorized user.

Next, the transmitter and receiver 51 of the terminal management server 5 transmits an authentication result to the electronic whiteboard 2x (S95). When the authenticator 52 determines that the IC card 3 is a legitimate IC card, (in other words, the terminal ID is a legitimate terminal ID), the authentication result includes information indicating that the IC card 3 is a legitimate IC card, the user ID identifying the user who owns the IC card 3, and the user name. When the authenticator 52 determines that the IC card 3 is not a legitimate IC card (in other words, the terminal ID is not a legitimate terminal ID), the authentication result includes information indicating that the IC card 3 is not a legitimate IC card. The electronic whiteboard 2x receives the authentication result at the transmitter and receiver 21.

Next, the electronic whiteboard 2x performs processing based on the authentication result (S96). Referring to FIG. 26, a description is given of S96 of the operation performed based on the authentication result.

As illustrated in FIG. 26, the determination unit 25 determines whether information included in the authentication result received at S95 indicates that the IC card 3 is a legitimate IC card (S96-1). In other words, the determination unit 25 determines whether the terminal ID transmitted at S93 is a legitimate terminal ID. When the determination unit 25 determines that the information included in the authentication result indicates that the IC card 3 is not a legitimate IC card (S96-1: NO), the display control 24 controls the display 220 to display the error notification screen 180 as illustrated in FIG. 14B (S96-2). By contrast, when the determination unit 25 determines that the information included in the authentication result indicates that the IC card 3 is a legitimate IC card (S96-1: YES), the determination unit 25 further determines whether the user ID received at S95 is the same as the user ID of the user A, who logs in the electronic whiteboard 2x (S96-3). When the determination unit 25 determines that the user ID received at S95 is the same as the user ID of the user A, who logs in the electronic whiteboard 2x (S96-3: YES), the display control 24 controls the display 220 to display the exit window 238, as illustrated in FIG. 8C (S96-4). By contrast, when the determination unit 25 determines that the user ID received at S95 is not the same as the user ID of the user A, who logs in the electronic whiteboard 2x (S96-3: NO), the display control 24 controls the display 220 to display the error notification screen 180, as illustrated in FIG. 14B (S96-2).

As described above, in a case in which the user A, who logs in the electronic whiteboard 2x, brings his or her IC card 3 into proximity of the near-distance communication device 221 when the folder selection screen 250 as illustrated in FIG. 9D, which is an example of a screen other than the destination configuration screen 270 illustrated in FIG. 10A and the print configuration screen 260 illustrated in FIG. 9, is being displayed under control of the display control 24, the determination unit 25 determines that the user A is logging off from the electronic whiteboard 2x. Accordingly, the display control 24 controls the display 220 to display the exit window 238 as illustrated in FIG. 8C. By contrast, in a case in which the user B, who does not log in the electronic whiteboard 2x, brings his or her smartphone 4 into proximity of the near-distance communication device 221 when the destination configuration screen 270 illustrated in FIG. 10A or the print configuration screen 260 illustrated in FIG. 9 is being displayed under control of the display control 24, the determination unit 25 determines that the user B has made an erroneous operation.

Accordingly, the display control 24 controls the display 220 to display the error notification screen 180 as illustrated in FIG. 14B.

It should be noted other examples of a screen other than the destination configuration screen 270 and the print configuration screen 260 as illustrated in FIG. 9 include the drawing image screen 230 (FIG. 8A), the menu selection window 232 (FIG. 8B), the folder selection screen 240 (FIG. 9A) that accepts selection of a folder to read out a file, the file selection screen 245 (FIG. 9B) that accepts selection of a file to be read out, the email configuration screen 280 (FIG. 10B), and the QR code display screen 290 (FIG. 10C).

As described heretofore, in the embodiment, a privately-owned terminal such as an IC card is used for logging in a shared terminal such as the electronic whiteboard 2x that can be shared by a plurality of users. Accordingly, security is ensured.

Further, it is possible to implement proxy printing (see 9D and FIG. 10D), while ensuring security with a privately-owned terminal such as the IC card 3.

Further, as described above, when the user A, who logs in the electronic whiteboard 2x, brings his or her own IC card 3 into proximity of the electronic whiteboard 2x, the operation proceeds to the display of the exit window 238 as illustrated in FIG. 8C (see S96-4). By contrast, when the user B, who does not log in the electronic whiteboard 2x, brings his or her own smartphone 4 into proximity of the electronic whiteboard 2x, the operation proceeds to the display of the error notification screen 180 as illustrated in FIG. 14 B (see S96-2). This enables the user A, who has logged in the electronic whiteboard 2x in a simple manner by bringing his or her IC card 3 into proximity of the electronic whiteboard 2x, to log out from the electronic whiteboard 2x in a simple manner, by bringing his or her IC card 3 into proximity of the electronic whiteboard 2x. Further, since the electronic whiteboard 2x does not accept a logout operation when the user B, who has not logged in the electronic whiteboard 2x, brings his or her smartphone 4 into proximity of the electronic whiteboard 2x, security is ensured.

Further, as described above, the setting unit 27 sets the email address of the user A, who logs in the electronic whiteboard 2x, as a sender email address and a destination email address (see S20). This enables the user A to easily set the email sender and the email destination. Furthermore, as described above, in a case in which the user B, who does not log in the electronic whiteboard 2x, brings his or her smartphone 4 into proximity of the electronic whiteboard 2x when the destination configuration screen 270 as illustrated in FIG. 10A is being displayed, the display control 24 controls the display 220 to additionally display the email address of the user B on the destination configuration screen 270 as illustrated in FIG. 14D (see S40). Accordingly, when the user B wants to transmit drawing image data to his or her own PC 10b, the user B does not have to enter or select his or her own e-mail address. This saves time and efforts for setting the email address.

Further, as described above, the setting unit 27 sets the user name of the A, who logs in the electronic whiteboard 2x, as the print requester name, and the display control 24 controls the display 220 to display the user name of the user A, who logs in the electronic whiteboard 2x, as the print requester name on the print configuration screen 260 (See S51). This enables the user A to easily set the print requester name. Furthermore, as described above, in a case in which the user B, who does not log in the electronic whiteboard 2x, brings his or her smartphone 4 into proximity of the electronic whiteboard 2x when the print configuration screen 260 as illustrated in FIG. 9D is being displayed, the display control 24 controls the display 220 to display the print configuration screen 260 as illustrated in FIG. 22, in which the print requester name is changed from the user name of the user A, who logs in the electronic whiteboard 2x, to the user name of the user B (see S56-4). This enables to perform printing in a simple manner, even in a case where the user B, who does not log in the electronic whiteboard 2x, wants to print the drawing image data. In other words, if secure printing is used in which printing is not started unless a user travels to a place where the MFP 9 is located and brings the user's privately-owned terminal close to the MFP 9, the user B, who does not log in the electronic whiteboard 2x, is not able to have the print data output from the MFP 9, even when the user B brings his or her smartphone 4 (privately-owned terminal) close to the MFP 9. On the other hand, in the present embodiment, the print requester is changed to the user B when the user B brings his or her smartphone 4 close to the electronic whiteboard 2x. Accordingly, even the user B, who does not log in the electronic whiteboard 2x, is able to have the print data printed by the MFP 9 with secure printing.

Further, the "Set another print requester" button 268 is displayed also on the print configuration screen 260 illustrated in FIG. 22. Accordingly, the user B (Jim) is able to have another user D such as a secretary to perform printing on behalf of the user B. In addition, in the present embodiment, both the user A (B) and another user C (D) are able to perform printing. Accordingly, if another user C (D) is in a situation where he or she is not able to travels to the place where the MFP 9 is located, the user A (B) him- or herself is able to have the print data printed by the MFP 9.

<Variations>

(1) Hereinafter, a description is given of a variation of a process or operation, with reference to FIG. 27. FIG. 27 is a sequence diagram illustrating another example of the login process. In this variation, steps S13 and S14 of FIG. 13 are replaced by steps S113 to S117 of FIG. 27, such that the following describes processes of S113 to S117. It should be noted that there may be a plurality of the terminal management servers 5. When the obtainer and provider 28 of the electronic whiteboard 2x obtains the terminal ID of the IC card 3 from the obtainer and provider 38 of the IC card 3 at S12 of FIG. 13, referring to FIG. 27, the transmitter and receiver 21 of the electronic whiteboard 2x transmits a connection key k1 to the terminal management server 5 (S113). The terminal management server 5 receives the connection key k1 at the transmitter and receiver 51. The connection key k1 is issued as a client of the terminal management server 5 that possesses information for authentication, and stored in advance in the memory 2000 of the electronic whiteboard 2x. On the other hand, a connection key k2 that is issued is stored in the memory 5000 of the terminal management server 5. The determination unit 55 of the terminal management server 5 determines whether the received connection key k1 matches the stored connection key k2 to determine whether access is allowed (S114). When the determination unit 55 determines that the connection key k1 matches the connection key k2, the determination unit 55 determines that access is allowed. By contrast, when the determination unit 55 determines that the connection key k1 does not matches the connection key k2, the determination unit 55 determines that access is not allowed. Next, the transmitter and receiver 51 of the terminal management server 5 transmits a determination result to the electronic whiteboard 2x (S115). When the determination unit 55 determines that access is allowed, the determination result includes information indicating that access is allowed and information a1. When the determination unit 55 determines that access is not allowed, the determination result includes information indicating that access is not allowed. The electronic whiteboard 2x receives the determination result at the transmitter and receiver 21. The access information a1 is, for example, a unique random alphanumeric string of 16 characters, 32 characters, 64 characters or the like. The access information is information generated by the determination unit 55 based on the determination by determination unit 55 that access is allowed. The generated access information a1 is stored temporarily in the memory 5000 by the storing and reading processor 59. Next, the electronic whiteboard 2x performs processing based on the determination result (S116). In one example, when the determination result includes information indicating that access is not allowed, the display control 24 controls the display 220 to display a notification indicating that access is not allowed. By contrast, when the authentication result includes information indicating that access is allowed, the operation proceeds to S117. The following describes the case where the determination result includes the information indicating that access is allowed. The transmitter and receiver 21 of the electronic whiteboard 2x transmits an authentication request to the terminal management server 5 (S117). The authentication request includes the terminal ID obtained at S12 and access information a2. The terminal management server 5 receives the authentication request at the transmitter and receiver 51. The authenticator 52 of the terminal management server 5 authenticates the IC card 3 using the access information a2 and the terminal ID (S118). More specifically, the determination unit 55 determines whether the received access information a2 matches the access information a1 that is temporarily stored in the memory 5000. When the determination unit 55 determines that the access information a2 matches the access information a1, the authenticator 52 performs authentication in substantially the same manner as S14 described referring to FIG. 13. By contrast, when the determination unit 55 determines that the received access information a2 does not match the access information a1 that is temporarily stored in the memory 5000, the authenticator 52 does not perform authentication. In this case, the transmitter and receiver 51 transmits, to the electronic whiteboard 2x, information indicating that the IC card 3 is not a legitimate IC card. Since operation after S118 is performed in substantially the same manner as described above referring to S14 and subsequent steps, description thereof is omitted. In one example, the transmitter and receiver 51 may encrypts the access information after S114, and transmits the encrypted access information at S115.

(2) In the above-described embodiments, the electronic whiteboards 2x and 2y are described as examples of a shared terminal, however, any other apparatus can be used as the shared terminal. Example of the shared terminal includes a whiteboard on which a user draws images or characters with a marker pen. In this case, the whiteboard is provided with a scanner for scanning the drawing image drawn on the whiteboard. Data of the drawing image scanned by the scanner is transmitted to the print server 8, or transmitted to the mail server 7 as being attached to an email.

For example, while the above-described example illustrates the example case in which the electronic whiteboard 2 is used as a shared terminal, various other devices may be used as the shared terminal. For example, any one of the above-described embodiments is also applicable to a projector that projects an image based on image data, and a videoconference terminal for transmitting and receiving image data and voice data to and from a plurality of terminals.

In one example, the projector may be input with drawings made by a user on a screen projected by the projector, using an electronic pen or a user's finger, for example. Further, the user is able to write on an image that is projected with the projector, such as an image of presentation material.

Similarly, in one example, the videoconference terminal may be input with drawings made by a user on a screen, which may be displayed or projected. For example, any writing made by the user, for example, on the electronic whiteboard or any material (such as paper or wall) may be captured using a camera of the videoconference terminal. Further, the videoconference terminal is able to capture, using a microphone, voices of participants.

According to an embodiment of the present disclosure, proxy printing is implemented while ensuring security.

The above-described embodiments are illustrative and do not limit the present disclosure. Thus, numerous additional modifications and variations are possible in light of the above teachings. For example, elements and/or features of different illustrative embodiments may be combined with each other and/or substituted for each other within the scope of the present disclosure.

Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), DSP (digital signal processor), FPGA (field programmable gate array) and conventional circuit components arranged to perform the recited functions.

What is claimed is:
1. A shared terminal, comprising:
circuitry configured to:
control a display to display an image to a plurality of users, the plurality of users simultaneously sharing a use of the shared terminal;
obtain, from a first terminal of a first user of the plurality of users, first terminal identification information for identifying the first terminal;
transmit the first terminal identification information of the first terminal and an authentication request, to a terminal management server, the terminal management server storing, for each one of the plurality of users, terminal identification information for identifying a terminal of a user in association with a user name of the user;
receive a first user name of the first user, the first user name being transmitted from the terminal management server based on a successful authentication result for the authentication request, the successful authentication result being obtained based on a determination that the first terminal identification information is stored in the terminal management server;
control the display to display a print configuration screen;
receive setting of print parameters for an image being displayed on the display via the print configuration screen;
receive an other user name of the plurality of users, wherein the other user name identifies a second print requester other than the first user for outputting the image; and
transmit data generated based on the image displayed on the display, the first user name, the other user name, and the print parameters that are set on the print configuration screen, to a print server, the print server storing, for data generated based on the image displayed on the display, the first user name and the other user name each as a print requester name, and the print parameters, in association with each other.
2. The shared terminal of claim 1, wherein
the circuitry is further configured to:
display a print requester configuration screen for setting other print requester name;
accept setting of the other user name as the other print requester name on the print requester configuration screen; and
transmit the other user name that is set on the print requester configuration screen to the print server.

3. The shared terminal of claim 2, wherein,
the print requester configuration screen is displayed for the first user, and
the setting of the other user name is selected by the first user to identify the second print requester for at least the image.

4. The shared terminal of claim 1, wherein
the circuitry is further configured to control the display to display the first user name as the print requester name on the print configuration screen.

5. The shared terminal of claim 1, wherein
the circuitry is further configured to:
transmit second terminal identification information to the terminal management server, in response to obtaining the second terminal identification information identifying a second terminal of a second user when the print configuration screen is being displayed;
receive a second user name of the second user, the second user name being transmitted from the terminal management server that receives the second terminal identification information from the shared terminal; and
control the display to display the print configuration screen in which the print requester name is changed from the first user name to the second user name.

6. The shared terminal of claim 5, wherein,
the first user is logged into the shared terminal, and
the second user is not logged into the shared terminal.

7. The shared terminal of claim 5, wherein,
the print requester configuration screen is presented as a request to transmit at least the image from at least one sender to at least one recipient; and
the circuitry is further configured to, on condition of receiving the second terminal identification information, include the second user in the at least one sender of at least the image and the at least one recipient of at least the image.

8. The shared terminal of claim 1, wherein the shared terminal is an electronic whiteboard.

9. The shared terminal of claim 1, wherein the authentication request requests the terminal management server to allow login by the first user.

10. A communication system comprising:
the shared terminal of claim 1;
the terminal management server; and
the print server.

11. The communication system of claim 10, further comprising the terminal of at least one of the plurality of users.

12. The communication system of claim 11, wherein the terminal is at least one of an IC card and a smartphone.

13. The communication system of claim 10, wherein the circuitry is further configured to,
obtain, by an output device, a third terminal identification information received by the output device;
identify a requesting user who is associated with the third terminal identification information;
compare a requesting user name of the requesting user with the first user name and the other user name that are stored by the print server in association with the data; and
on condition of determining that the requesting user name matches the first user name and/or the other user name in association with the data, transmit an output request to the print server to output the data by the output device.

14. The communication system of claim 13, wherein the third terminal identification matches:
the first terminal identification information of the first user, and/or
second terminal identification information of an other user identified by the other user name.

15. The communication system of claim 13, wherein comparing the requesting user name further comprises,
transmitting the third terminal identification information to the terminal management server, and
determining, by the terminal management server, the requesting user name that is associated with the third terminal identification information.

16. The shared terminal of claim 1, wherein receiving the other user name further comprises determining that the other user name is associated with the first user.

17. The shared terminal of claim 1, wherein,
the first terminal identification information is further obtained as a request to transmit at least the image from at least one sender to at least one recipient, and
the circuitry is further configured to, on condition of receiving the first terminal identification information, include the first user in at least one sender of at least the image and at least one recipient of at least the image.

18. The shared terminal of claim 1, wherein,
the first terminal identification information is further obtained as a request to transmit at least the image from at least one sender to at least one recipient, and
the circuitry is further configured to, on condition of receiving the first terminal identification information, include, in the at least one sender, an address of a device that is associated with the first user and/or the other user.

19. A communication control method performed by a shared terminal, the method comprising:
controlling a display to display an image to a plurality of users, the plurality of users simultaneously sharing a use of the shared terminal;
obtaining, from a first terminal of a first user of the plurality of users, first terminal identification information for identifying the first terminal;
transmitting the first terminal identification information of the first terminal and an authentication request, to a terminal management server, the terminal management server storing, for each one of the plurality of users, terminal identification information for identifying a terminal of a user in association with a user name of the user;
receiving a first user name of the first user, the first user name being transmitted from the terminal management server based on a successful authentication result for the authentication request, the successful authentication result being obtained based on a determination that the first terminal identification information is stored in the terminal management server;
controlling the display to display a print configuration screen;
receiving setting of print parameters for the image being displayed on the display via the print configuration screen;
receiving an other user name of the plurality of users, wherein the other user name identifies a second print requester other than the first user for outputting the image; and
transmitting data generated based on the image displayed on the display, the first user name, the other user name, and the print parameters that are set on the print configuration screen, to a print server, the print server storing, for data generated based on the image, the first user name and the other user name each as a print requester name, and the print parameters, in association with each other.

20. A non-transitory computer-readable medium storing a plurality of instructions which, when executed by one or more processors, cause the processors to perform a communication control method performed by a shared terminal, the method comprising:
displaying an image to a plurality of users, the plurality of users simultaneously sharing a use of the shared terminal;
obtaining, from a first terminal of a first user of the plurality of users, first terminal identification information for identifying the first terminal;
transmitting the first terminal identification information of the first terminal and an authentication request, to a terminal management server, the terminal management server storing, for each one of the plurality of users, terminal identification information for identifying a terminal of a user in association with a user name of the user;
receiving a first user name of the first user, the first user name being transmitted from the terminal management server based on a successful authentication result for the authentication request, the successful authentication result being obtained based on a determination that the first terminal identification information is stored in the terminal management server;
controlling a display to display a print configuration screen;
receiving setting of print parameters for the image being displayed on the display via the print configuration screen;
receiving an other user name of the plurality of users, wherein the other user name identifies a second print requester other than the first user for outputting the image; and
transmitting data generated based on the image displayed on the display, the first user name, the other user name, and the print parameters that are set on the print configuration screen, to a print server, the print server storing, for data generated based on the image, the first user name and the other user name each as a print requester name, and the print parameters, in association with each other.

* * * * *